US008135359B2

(12) United States Patent
Raaf et al.

(10) Patent No.: US 8,135,359 B2
(45) Date of Patent: Mar. 13, 2012

(54) METHOD AND APPARATUS FOR CONVEYING ANTENNA CONFIGURATION INFORMATION

(75) Inventors: Bernhard Raaf, Neuried (DE); Timo Eric Roman, Espoo (FI); Mieszko Chmiel, Glucholazy (PL)

(73) Assignee: Nokia Corporation, Espoo (FI)

( * ) Notice: Subject to any disclaimer, the term of this patent is extended or adjusted under 35 U.S.C. 154(b) by 873 days.

(21) Appl. No.: 11/969,794

(22) Filed: Jan. 4, 2008

(65) Prior Publication Data

US 2009/0176463 A1 Jul. 9, 2009

(51) Int. Cl.
H04B 7/02 (2006.01)
(52) U.S. Cl. ............... 455/101; 455/279.1; 455/575.7; 455/562.1; 455/82; 455/63.4; 375/299
(58) Field of Classification Search .......... 455/101, 455/279.1, 575.7, 562.1, 82, 63.4, 19; 375/299
See application file for complete search history.

(56) References Cited

U.S. PATENT DOCUMENTS

| 2004/0147289 A1* | 7/2004 | Paljug et al. ............... 455/562.1 |
| 2007/0135161 A1 | 6/2007 | Molnar et al. |
| 2009/0060088 A1* | 3/2009 | Callard et al. ............... 375/299 |

FOREIGN PATENT DOCUMENTS

| EP | 1 679 814 A2 | 7/2006 |
| JP | 2006-197597 A | 7/2006 |
| WO | WO 2009/090482 A2 | 7/2009 |

OTHER PUBLICATIONS

U.S Appl. No. 60/954,357, filed Aug. 7, 2007.*
3GPP TS 36.211, Technical Specification Group Radio Access Network, "Evolved Universal Terrestrial Radio Access (E-UTRA); Physical Channels and Modulation", v.8.0.0.
R1-074861, "Invariant PBCH Structure", Nokia Siemens Networks, Nokia, Motorola, Panasonic.
R1-072405, "SFBC Definition Based on the 3GPP WCDMA/HSDPA Standard", Broadcom, Lucent-Alcatel, Huawei, Nokia.
R1-073309, "The detection of the antenna configuration", Nortel.
3GPP TS 36.212, Technical Specification Group Radio Access Network, "Evolved Universal Radio Access (E-UTRA); Multiplexing and channel coding", v.8.0.0.
Nokia Siemens Networks et al., "CRC Mask Selection for PBCH", 3GPP Draft; R1-080944, $3^{rd}$ Generation Partnership Project (3GPP), Mobile Competence Centre; 650, Route Des Lucioles; F-06921 Sophia-Antipolis Cedex; France, vol. RAN WG1, No. Sorrento, Italy; Feb. 5, 2008.
Nokia Siemens Networks et al., "Issues with PBCH-based Blind Antenna Configuration Detection", 3GPP Draft; R1-080324, $3^{rd}$ Generation Partnership Project (3GPP), Mobile Competence Centre; 650, Route Des Lucioles; F-06921 Sophia-Antipolis Cedex; France, vol. RAN WG1, No. Sevilla, Spain; Jan. 8, 2008.

(Continued)

*Primary Examiner* — Sanh Phu
(74) *Attorney, Agent, or Firm* — Alston & Bird LLP

(57) ABSTRACT

A method, apparatus and computer program product are provided for conveying information regarding the antenna configuration and/or the transmission diversity scheme to a recipient, such as a mobile device. In particular, information regarding the antenna configuration and/or the transmission diversity scheme can be conveyed by appropriately mapping a physical broadcast channel within a sub-frame so as to include reference signals indicative of different antenna configurations or transmission diversity schemes. Alternatively, masking, such as cyclic redundancy check masking, can be used to provide information regarding the antenna configuration and/or the transmission diversity scheme.

18 Claims, 17 Drawing Sheets

OTHER PUBLICATIONS

Nokia Siemens Networks et al., "Way Forward on PBCH for FDD and TDD", 3GPP Draft; R1-080586, 3$^{rd}$ Generation Partnership Project (3GPP), Mobile Competence Centre; 650, Route Des Lucioles; F-06921 Sophia-Antipolis Cedex; France, vol. RAN WG1, No. Sevilla, Spain; Jan. 17, 2008.
Partial Search Report for PCT/IB2008/003554 dated Aug. 25, 2009.
Search Report and Written Opinion for PCT/IB2008/003554 dated Nov. 17, 2009.
International Search Report issued in connection with International Application No. PCT/IB2009/050044 and mailed on Aug. 24, 2009.
International Preliminary Report on Patentability and Written Opinion issued in connection with International Application No. PCT/IB2009/050044 and issued on Aug. 10, 2010.
International Preliminary Report on Patentability issued in connection with International Application No. PCT/IB2008/003554 and completed Apr. 9, 2010.
Office Action for Mexican Application No. MX/a/2010/006592 dated Sep. 12, 2011.
Non-Final Rejection issued by the Korean Intellectual Property Office for Korean Patent Application No. 10-2010-7017354, dated Jun. 14, 2011.
Office Action for Russian Application No. 2010132264/08(045621) dated Sep. 1, 2011.
Office Action for Mexican Application No. MX/a/2010/006594 dated Oct. 21, 2011.
Office Action for Japanese Application No. 2010-541869 dated Dec. 20, 2011.

* cited by examiner

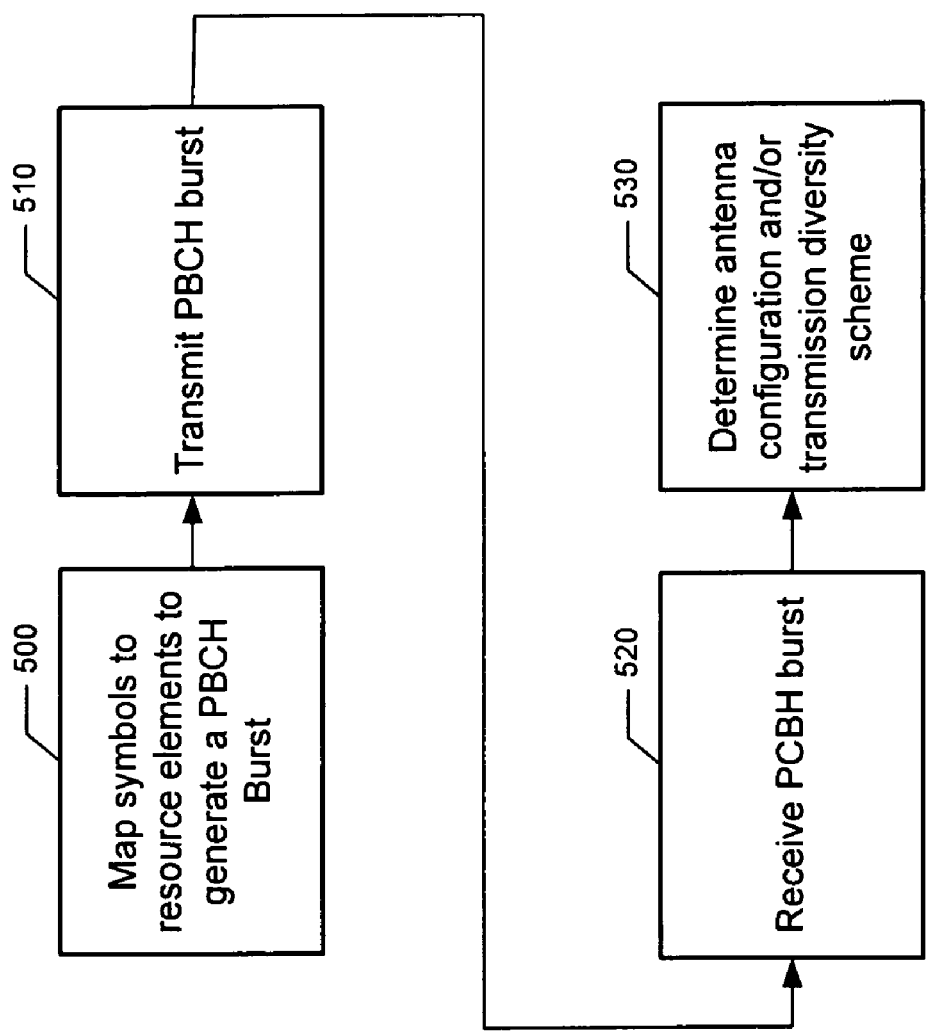

METHOD AND APPARATUS FOR CONVEYING ANTENNA CONFIGURATION INFORMATION

TECHNOLOGICAL FIELD

Embodiments of the present invention relate generally to communications between a network entity, such as a base station, and a recipient, such as a mobile terminal, and, more particularly, relate to a method and apparatus for conveying antenna configuration information.

BACKGROUND

In conventional wireless communications systems, mobile devices or other user equipment transmit information to a network, and receive information from a network, such as via a base station. In some networks, the base stations or other network entities which transmit information to the user equipment may include different antenna configurations, such as different numbers of antennas, e.g., one antenna, two antennas or four antennas, and/or may transmit the information in accordance with different transmission diversity schemes. In this regard, a base station with a single antenna may transmit information without any transmission diversity scheme, while base stations with two or four antennas may transmit information in accordance with a transmission diversity scheme or a specific transmission diversity scheme out of a set of different available transmission diversity schemes. As used herein, the information regarding the antenna configuration, e.g., the number of antennas, and/or the transmission diversity scheme shall be commonly referenced (both individually and collectively) as antenna configuration information. In order to effectively receive information from a base station, for example, the user equipment must have know or recognize the antenna configuration and/or the transmission diversity scheme utilized by the base station. A mobile device is able to properly demodulate a received signal only after correctly determining the antenna configuration, i.e., the number of transmit antennas and/or the transmission diversity scheme of a base station. Since the antenna configuration information is needed in order to properly demodulate the received signal, the antenna configuration information must be determined by the user equipment with very high reliability.

For example, in an Evolved Universal Mobile Telecommunication System (UMTS) Terrestrial Radio Access Network (E-UTRAN), the user equipment can gather antenna configuration information regarding the base station, termed an eNodeB in E-UTRAN, using data contained within orthogonal frequency division multiplexing (OFDM) symbols of a message. By way of example, the technical specifications of the Third Generation Partnership Project (3GPP) and, in particular, 3GPP TS 36.211, REL 8 and 3GPP TS 36.212, REL 8 allows for an approach for providing antenna configuration information. In this regard, the user equipment can extract antenna configuration information from provided reference signals or by attempts to decode data within a physical broadcast channel (PBCH).

FIGS. 1a-1f depict sub-frames within a conventional cyclical prefix for various antenna configurations and transmission diversity schemes in an E-UTRAN system. The sub-frames of FIGS. 1a-1f include six physical resource blocks (PRBs), i.e. 1080 kHz (72 sub-carriers), each of which comprises a sub-frame #0. Each sub-frame can consist of a plurality of resource elements which fill two slots, namely, a slot #0 and a slot #1. Each slot can, in turn, be comprised of a series of orthogonal frequency division multiplexing (OFDM) symbols which represent respective channels of information. In this regard, the sub-frames of FIGS. 1a-1f can include a physical downlink (or download) control channel (PDCCH), a physical downlink shared channel (PDSCH), a primary synchronization channel (P-SCH), a secondary synchronization channel (S-SCH), a physical broadcast channel (PBCH), and unused sub-carriers.

The E-UTRAN sub-frame #0 also includes a plurality of reference signals which fill predetermined resource elements which depend upon the antenna configuration. For example, in the sub-frames of FIGS. 1a-1f, the reference signals are designated R0, R1, R2, and R3 and are transmitted from a first, second, third and fourth antenna of the eNodeB respectively. In an E-UTRAN system, an eNodeB may include one, two or four antennas, each of which employs a different transmission diversity scheme. As shown, the sub-frame #0 may place the reference signals within different predetermined resource elements depending upon the number of antennas employed by the eNodeB.

Further, E-UTRAN supports sub-frames with both conventional cyclical prefixes and extended cyclical prefixes. As such, FIGS. 1a-1c depict sub-frames with conventional cyclical prefixes with sub-frames having fourteen symbols. On the other hand, FIGS. 1d-1f depict sub-frames with extended cyclical prefixes with sub-frames comprising twelve symbols.

In E-UTRAN, the eNodeB does not explicitly inform the user equipment of the number of antennas and, in turn, the transmission diversity scheme. Instead, the user equipment can generally analyze the provided reference signals in an effort to determine the number of antennas and/or the transmission diversity scheme employed by the eNodeB. In general, reference signals are placed throughout a sub-frame, within the PBCH and otherwise, according to the number of transmit antennas at the base station. The reference signals are mainly intended to be used for channel estimation purposes. Regardless of a reference signal's location within the sub-frame, detecting the presence of a reference signal can allow user equipment to determine the number of transmit antennas at the base station. However, there is evidence that such a procedure is not reliable at the low signal-to-noise ratio conditions where the PBCH is designed to operate. Referring now to FIGS. 1a-1c, the PBCH is comprised of symbol #3 and symbol #4 of slot #0, and symbol #0 and symbol #1 of slot #1. In the single antenna configuration of FIG. 1a, symbol #4 of slot #0 and symbol #0 of slot #1 contain reference signals that provide antenna configuration information. Referring now to the two antenna configuration of FIG. 1b, symbol #4 of slot #0 and symbol #0 of slot #1 contain reference signals associated with the first and second antennas of the eNodeB designated R0 and R1, respectively. Similarly, referring to the four antenna configuration of FIG. 1c, symbol #4 of slot #0 and symbols #0 and #1 of slot #1 contain reference signals associated with four antennas, namely, R0, R1, R2, and R3. By analyzing the reference signals, the user equipment can attempt to determine the number of antennas and, in turn, the transmission diversity scheme employed by the eNodeB, such as space-frequency block codes (SFBC) used by two antenna eNodeBs and frequency switched transmit diversity (SFBC-FSTBC) used by four antenna eNodeBs. The user equipment can similarly analyze the PBCH or the reference signals in the sub-frames with extended cyclical prefixes of FIGS. 1d-1f in an effort to determine the antenna configuration information, except that the PBCH in the extended cyclical prefix cases is associated with symbol #3 of slot #0 and symbols #0, #1, and #2 of slot #1.

However, while antenna configuration information can be derived from the reference signals, the user equipment is, at least initially, not aware of the antenna configuration and/or the transmission diversity scheme prior to receiving and demodulating the PBCH. Further, since the antenna configuration information is needed to properly demodulate data and control channels, data loss and latency can result if the user equipment incorrectly identifies the antenna configuration and/or the transmission diversity scheme or if the user equipment is slow in identifying the antenna configuration and/or the transmission diversity scheme. As a result, some user equipment is designed to make assumptions regarding the antenna configuration and/or transmission diversity scheme. These assumptions of antenna configuration and/or transmission diversity scheme may be made prior to, or during demodulation of the PBCH and may not always be correct. In this regard, user equipment may reach an assumption regarding the antenna configuration and/or transmission diversity scheme based on a subset of the information in the PBCH. For example, in some instances, an early PBCH decoding scheme may be utilized which uses information gathered from the first of four bursts of information comprising the PBCH. Similarly, noise in the received signal may also affect the user equipment's assumption regarding an antenna configuration and/or transmission diversity scheme.

The error rate associated with the user equipment's assumption of the antenna configuration and/or the transmission diversity scheme or at least the adverse consequences which flow from an incorrect assumption can be exacerbated due to the conventional mapping of the PBCH within a sub-frame. For example, consider the PBCH of the sub-frames in FIG. 1b (for a two antenna base station) and FIG. 1c (for a four antenna base station). Note that the first three symbols of the PBCH are identical with respect to the reference signals, namely, symbols #3 and #4 of slot #0, and symbol #0 of slot #1. It is not until the final symbol of the PBCH that a difference in the antenna configuration can be ascertained as a result of the provision of R2 and R3 providing information regarding the third and fourth antennas, respectively. As such, the similarities of the PBCH for a two antenna configuration and a four antenna configuration can increase the error rate associated with the user equipment's assumption of the antenna configuration and/or the transmission diversity scheme or at least the adverse consequences which flow from an incorrect assumption.

Additionally, conventional diversity schemes for PBCH share large portions of signals. As such, an incorrect selection of a diversity scheme implemented to decode the PBCH can result in a proper decoding of the PBCH. The incorrect selection may then be used further which can result in substantial errors in communications. Under the conventional PBCH mapping this result can occur relatively frequently when considering that the various antenna configurations share a large number of resource elements.

Thus, in order to avoid or reduce the loss of data and communication latency, it would be desired to provide an improved technique for more reliably determining the antenna configuration and/or transmission diversity scheme of a network entity, such as a base station.

BRIEF SUMMARY

A method and apparatus are therefore provided in accordance with embodiments of the present invention to provide additional information relating to an antenna configuration and/or a transmission diversity scheme. As such, embodiments of the method and apparatus permit a recipient to reliably distinguish between a plurality of antenna configurations and/or transmission diversity schemes, thereby permitting the transmitted data to be more reliably demodulated and interpreted. Moreover, embodiments of the method and apparatus are configured to provide this additional information without transmitting any additional bits or otherwise adding to the overhead associated with the transmission of the data.

According to one aspect, a method and apparatus including a processor are provided for obtaining a bit mask based upon an antenna configuration and/or a transmission diversity scheme, and for then masking a plurality of bits to be transmitted with the bit mask to thereby impart information regarding the antenna configuration and/or the transmission diversity scheme. The plurality of bits which are masked may be bits of a physical broadcast channel. In one embodiment, for example, the plurality of bits which are masked may be a plurality of cyclic redundancy check (CRC) bits. In one embodiment, the bit mask is sufficient to permit at least three different antenna configurations or transmission diversity schemes to be uniquely distinguished.

In another aspect, a method and apparatus including a processor are provided for analyzing a plurality of bits that were received to determine which one of a plurality of predefined bit masks has been applied to the bits, and for then determining an antenna configuration and/or a transmission diversity scheme based upon the respective bit mask that is determined to have been applied to the bits. The plurality of bits which are analyzed may be bits of a physical broadcast channel. In one embodiment, for example, the plurality of bits which are analyzed may be a plurality of CRC bits. In one embodiment, the bit mask is sufficient to permit at least three different antenna configurations or transmission diversity schemes to be uniquely distinguished.

In yet another aspect, a method and an apparatus including a processor are provided for mapping a plurality of symbols which comprise a physical broadcast channel to a plurality of resource elements. In this regard, predefined ones of the resource elements are reserved for reference signals indicative of an antenna configuration and/or a transmission diversity scheme. The method and apparatus of this aspect are further configured to map the plurality of symbols such that sufficient reference signals are included within the first two symbols of the physical broadcast channel to permit at least three different antenna configurations or transmission diversity schemes to be uniquely distinguished. In instances in which the physical broadcast channel is included in a sub-frame having first and second slots, the method and apparatus may be configured to map all of the symbols which comprise the physical broadcast channel in the second slot of the sub-frame. In one embodiment, the method and apparatus may be configured to map all of the symbols which comprise the physical broadcast channel to a plurality of contiguous symbols.

In a further aspect, a method and apparatus including a processor are provided for receiving a plurality of symbols which comprise a physical broadcast channel, and for then determining an antenna configuration and/or a transmission diversity scheme based upon differences in a physical broadcast channel due to reference signals included within the first two symbols of the physical broadcast channel. In this aspect, the method and apparatus are further configured to uniquely distinguish between at least three different antenna configurations or transmission diversity schemes based upon the reference symbols included within the first two symbols of the physical broadcast channel. In instances in which the physical broadcast channel is included in a sub-frame having first and second slots, the method and apparatus may be further configured to receive all of the symbols which comprise the physical broadcast channel in the second slot of the sub-frame. In one embodiment, the method and apparatus may be further configured to receive all of the symbols which comprise the physical broadcast channel in a plurality of contiguous symbols.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

FIG. 5 is a flowchart of the operations associated with broadcast channel transmission and reception in accordance with an embodiment of the present invention;

DETAILED DESCRIPTION

Figure 1A:
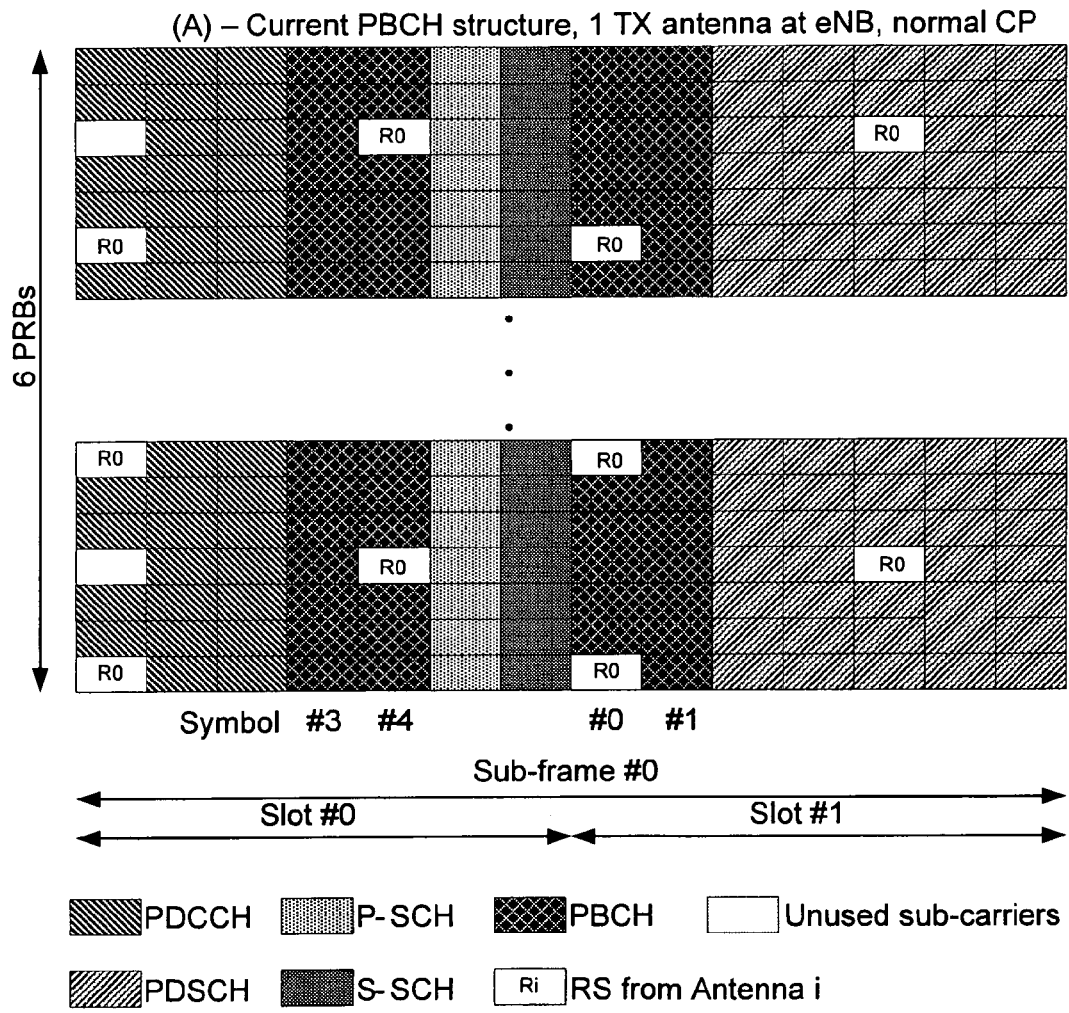
FIG. 1a is diagram of a conventional sub-frame with a normal cyclical prefix for a single antenna base station.

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

Figure 2:
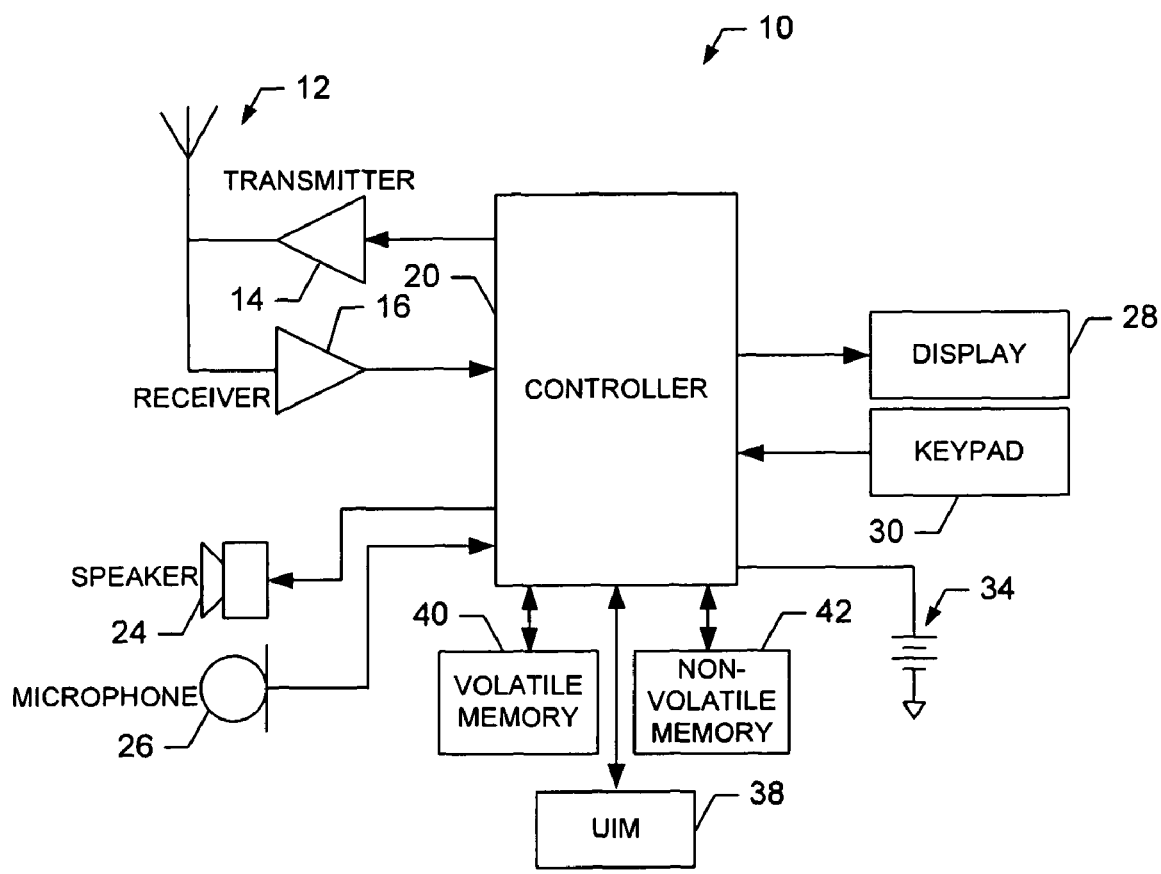
FIG. 2 is a schematic block diagram of a mobile terminal according to an embodiment of the present invention.

FIG. 2 illustrates a block diagram of a mobile terminal 10 that would benefit from embodiments of the present invention. It should be understood, however, that a mobile telephone as illustrated and hereinafter described is merely illustrative of one type of mobile terminal (also known as user equipment) that would benefit from embodiments of the present invention and, therefore, should not be taken to limit the scope of embodiments of the present invention. While one embodiment of the mobile terminal 10 is illustrated and will be hereinafter described for purposes of example, other types of mobile terminals, such as portable digital assistants (PDAs), pagers, mobile computers, mobile televisions, gaming devices, laptop computers, cameras, video recorders, GPS devices and other types of voice and text communications systems, can readily employ embodiments of the present invention. Furthermore, user equipment that is not mobile may also readily employ embodiments of the present invention.

The system and method of embodiments of the present invention will be primarily described below in conjunction with mobile communications applications. However, it should be understood that the system and method of embodiments of the present invention can be utilized in conjunction with a variety of other applications, both in the mobile communications industries and outside of the mobile communications industries.

The mobile terminal 10 includes an antenna 12 (or multiple antennae) in operable communication with a transmitter 14 and a receiver 16. The mobile terminal 10 further includes an apparatus, such as a controller 20 or other processing element that provides signals to and receives signals from the transmitter 14 and receiver 16, respectively. The signals include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS) including UTMS Long Term Evolution (UTMS LTE), CDMA2000, wideband CDMA (WCDMA) and time division-synchronous CDMA (TD-SCDMA), with fourth-generation (4G) wireless communication protocols or the like.

It is understood that the apparatus such as the controller 20 includes means, such as circuitry, desirable for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other hard and/or soft keys used for operating the mobile terminal 10. Alternatively, the keypad 30 may include a conventional QWERTY keypad arrangement. The keypad 30 may also include various soft keys with associated functions. In addition, or alternatively, the mobile terminal 10 may include an interface device such as a joystick or other user input interface. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an electrically erasable programmable read only memory (EEPROM), flash memory or the like. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10.

Figure 3:
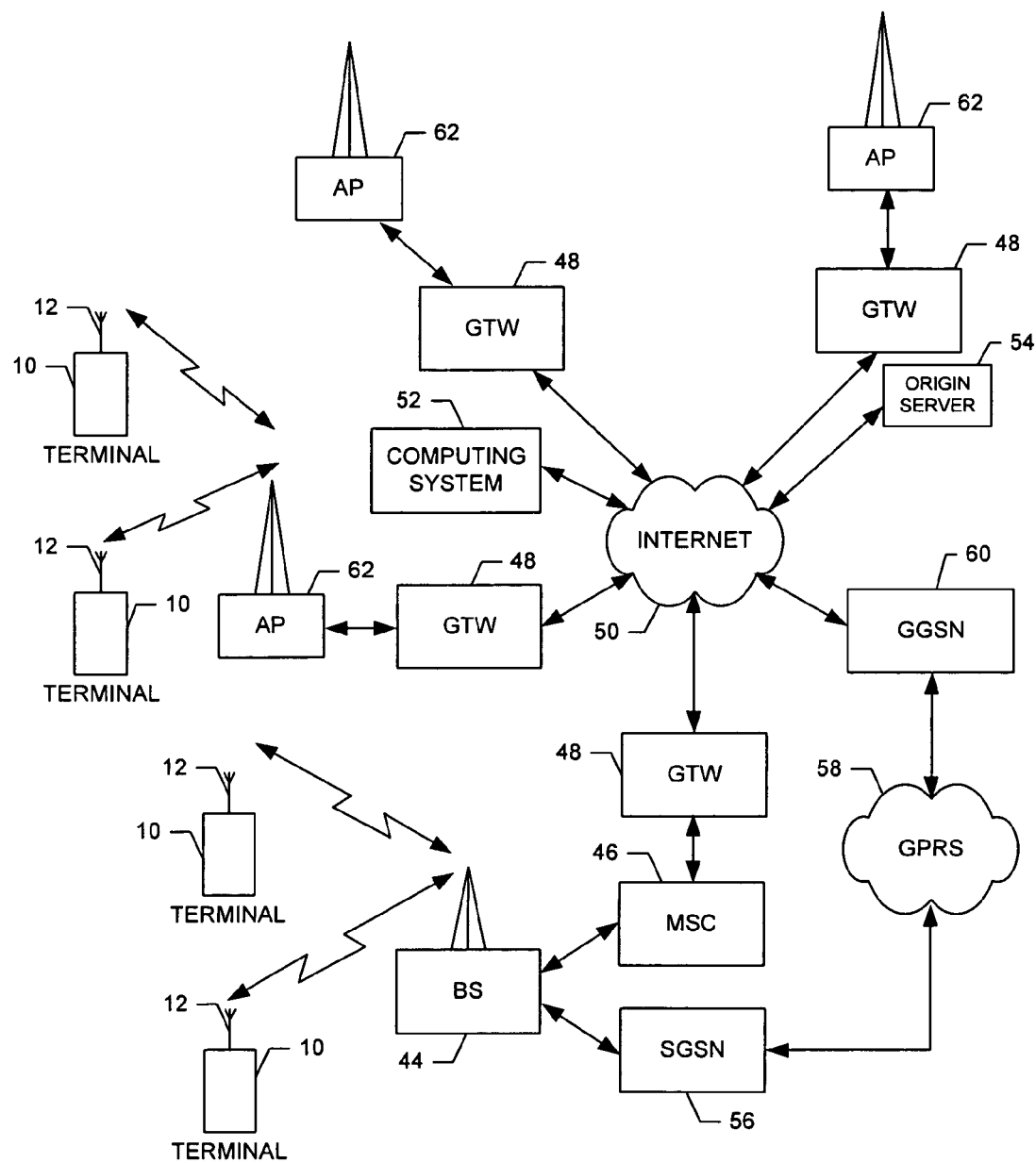
FIG. 3 is a schematic block diagram of a communications system according to an embodiment of the present invention.

Referring now to FIG. 3, an illustration of one type of system that would benefit from embodiments of the present invention is provided. The system includes a plurality of network devices, such as mobile terminals 10 or other types of user equipment. As shown, one or more mobile terminals 10 may each include an antenna 12 for transmitting signals to and for receiving signals from a base site or base station (BS) 44, such as an eNodeB in E-UTRAN. The base station 44 may be a part of one or more cellular or mobile networks each of which includes elements required to operate the network, such as a mobile switching center (MSC) 46. As well known to those skilled in the art, the mobile network may also be referred to as a Base Station/MSC/Interworking function (BMI). In operation, the MSC 46 is capable of routing calls to and from the mobile terminal 10 when the mobile terminal 10 is making and receiving calls. The MSC 46 can also provide a connection to landline trunks when the mobile terminal 10 is involved in a call. In addition, the MSC 46 can be capable of controlling the forwarding of messages to and from the mobile terminal 10, and can also control the forwarding of messages for the mobile terminal 10 to and from a messaging center. It should be noted that although the MSC 46 is shown in the system of FIG. 2, the MSC 46 is merely an exemplary network device and embodiments of the present invention are not limited to use in a network employing an MSC.

BS 44 can utilize various antenna configurations and/or transmission diversity schemes. Antenna configurations can include BS 44 having one or more antennas that utilize various transmission diversity schemes. For example, in some embodiments, BS 44 can comprise a single transmit antenna. In other exemplary embodiments, BS 44 can comprise a two transmit antennas that can use space-frequency block codes (SFBC) as a transmission diversity scheme. In still other exemplary embodiments, BS 44 can comprise four transmit antennas that can use a SFBC frequency switched transmit diversity (FSTD) transmission diversity scheme.

In one embodiment, the MSC 46 can be coupled to a data network, such as a local area network (LAN), a metropolitan area network (MAN), and/or a wide area network (WAN). The MSC 46 can be directly coupled to the data network. In one typical embodiment, however, the MSC 46 is coupled to a gateway device (GTW) 48, and the GTW 48 is coupled to a WAN, such as the Internet 50. In turn, devices such as processing elements (e.g., personal computers, server computers or the like) can be coupled to the mobile terminal 10 via the Internet 50. For example, the processing elements can include one or more processing elements associated with a computing system 52, origin server 54, and/or the like, as described below.

The BS 44 can also be coupled to a signaling GPRS (General Packet Radio Service) support node (SGSN) 56. As known to those skilled in the art, the SGSN 56 is typically capable of performing functions similar to the MSC 46 for packet switched services. The SGSN 56, like the MSC 46, can be coupled to a data network, such as the Internet 50. The SGSN 56 can be directly coupled to the data network. In a more typical embodiment, however, the SGSN 56 is coupled to a packet-switched core network, such as a GPRS core network 58. The packet-switched core network is then coupled to another GTW 48, such as a GTW GPRS support node (GGSN) 60, and the GGSN 60 is coupled to the Internet 50. In addition to the GGSN 60, the packet-switched core network can also be coupled to a GTW 48. Also, the GGSN 60 can be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the HyperText Transfer Protocol (HTTP) and/or the like, to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) may be capable of supporting communication in accordance with any one of a variety of communication protocols, such as one or more of a number of first-generation (1G), second-generation (2G), 2.5G, third-generation (3G), 3.9G, fourth-generation (4G) mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as E-UTRAN or a UMTS network employing WCDMA radio access technology. Some narrow-band analog mobile phone service (NAMPS), as well as total access communication system (TACS), network(s) may also benefit from embodiments of the present invention, as should dual or higher mode mobile stations (e.g., digital/analog or TDMA/CDMA/analog phones).

The mobile terminal 10 can further be coupled to one or more wireless access points (APs) 62. The APs 62 may comprise access points configured to communicate with the mobile terminal 10 in accordance with techniques such as, for example, radio frequency (RF), Bluetooth (BT), infrared (IrDA) or any of a number of different wireless networking techniques, including wireless LAN (WLAN) techniques such as IEEE 802.11 (e.g., 802.11a, 802.11b, 802.11g, 802.11n, etc.), world interoperability for microwave access (WiMAX) techniques such as IEEE 802.16, and/or ultra wideband (UWB) techniques such as IEEE 802.15 and/or the like. The APs 62 may be coupled to the Internet 50. Like with the MSC 46, the APs 62 can be directly coupled to the Internet 50. In one embodiment, however, the APs 62 are indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 can communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

As will be appreciated, by directly or indirectly connecting the mobile terminals 10 and the computing system 52, the origin server 54, and/or any of a number of other devices, to the Internet 50, the mobile terminals 10 can communicate with one another, the computing system, 52, the origin server 54, etc., to thereby carry out various functions of the mobile terminals 10, such as to transmit data, content or the like to, and/or receive content, data or the like from, the computing system 52, and/or the origin server 54, etc.

Figure 4A:
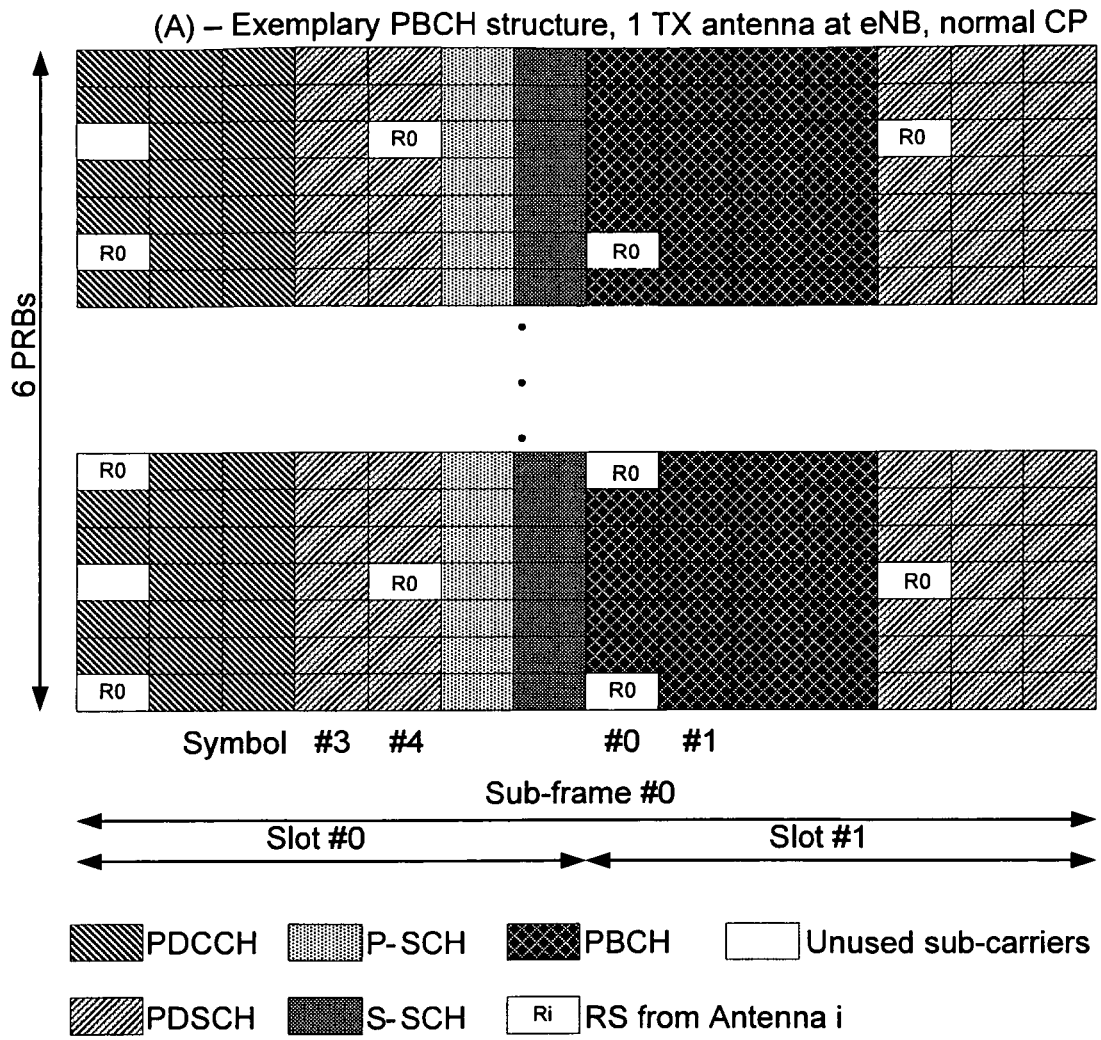
FIG. 4a is diagram of a sub-frame with a normal cyclical prefix for a single antenna base station according to an embodiment of the present invention.
Figure 4B:
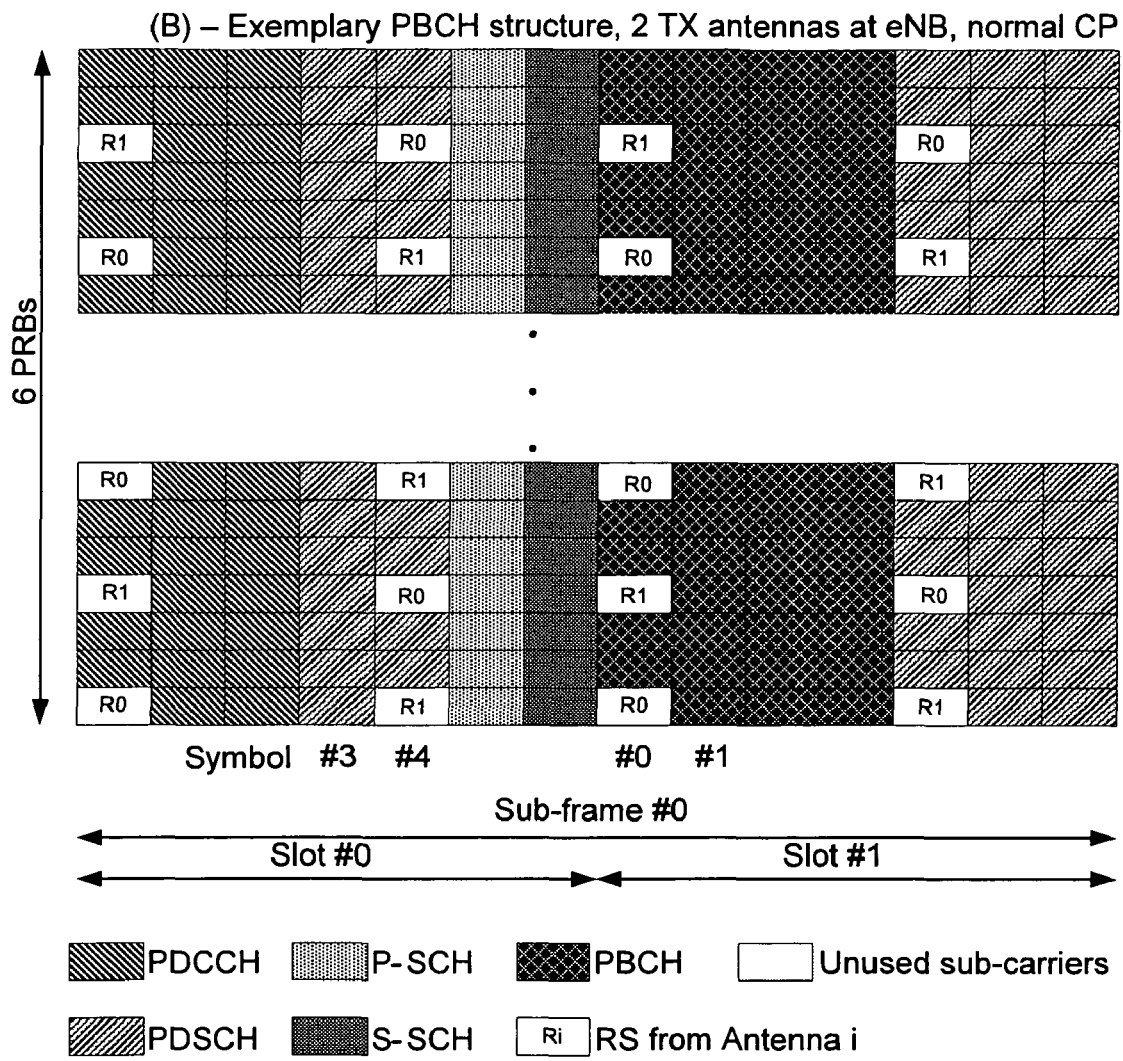
FIG. 4b is diagram of a sub-frame with a normal cyclical prefix for a two antenna base station according to an embodiment of the present invention.
Figure 4C:
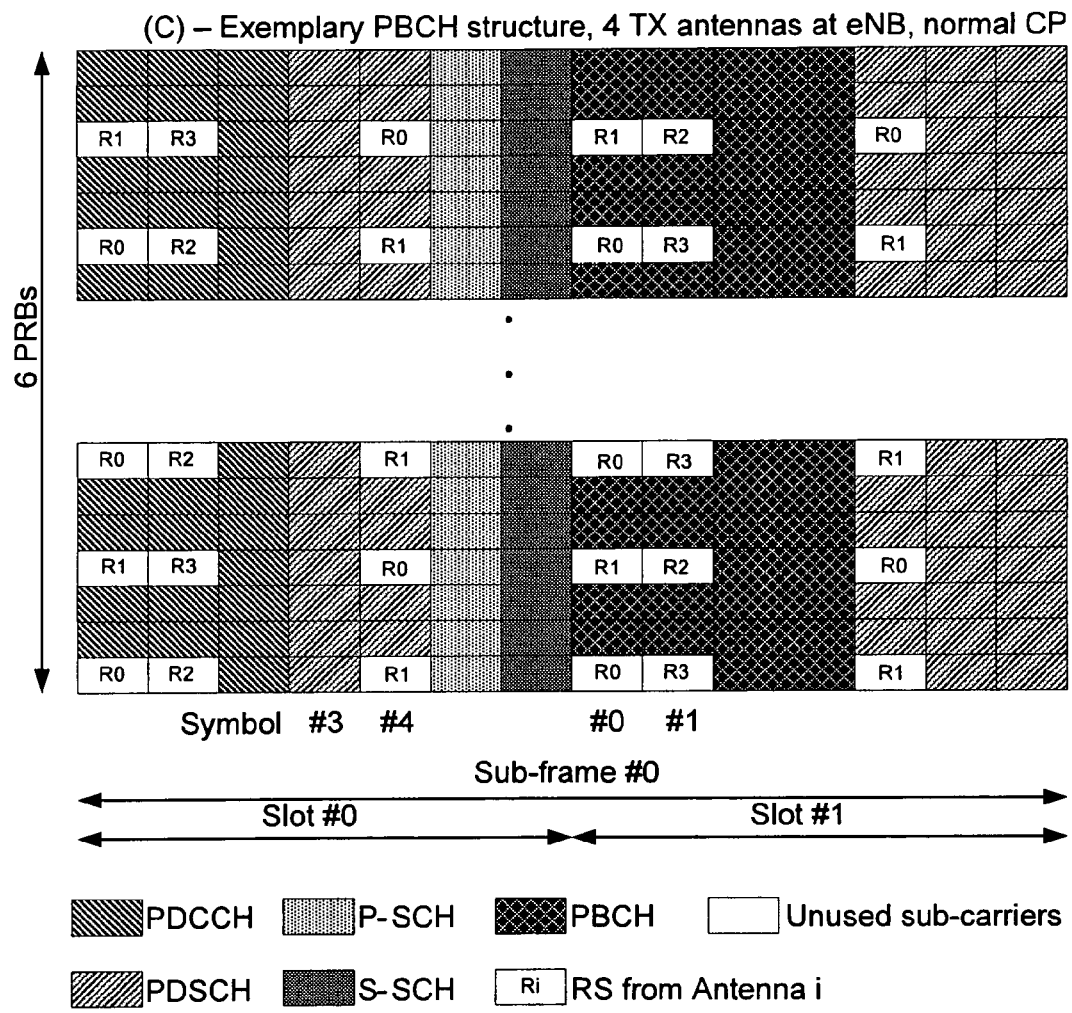
FIG. 4c is diagram of a sub-frame with a normal cyclical prefix for a four antenna base station according to an embodiment of the present invention.
Figure 4D:
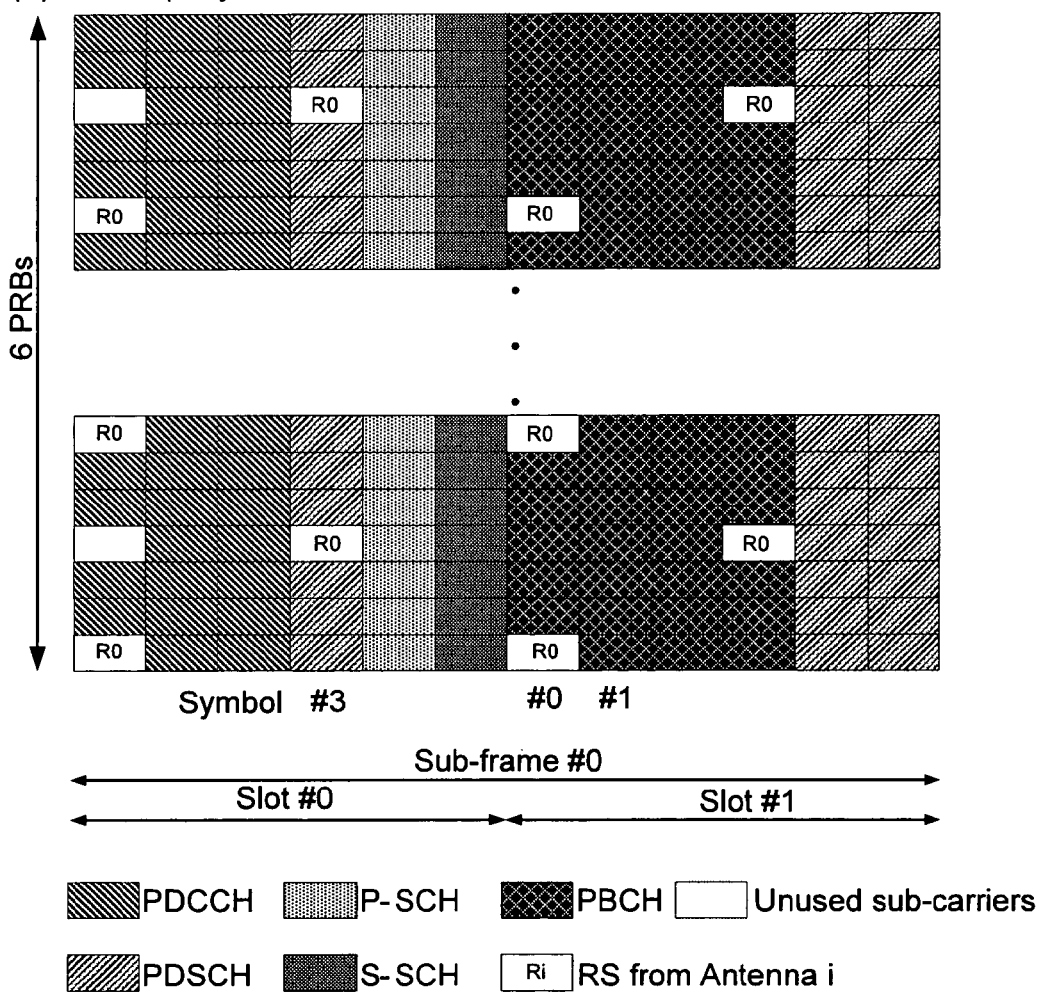
FIG. 4d is diagram of a sub-frame with an extended cyclical prefix for a single antenna base station according to an embodiment of the present invention.
Figure 4E:
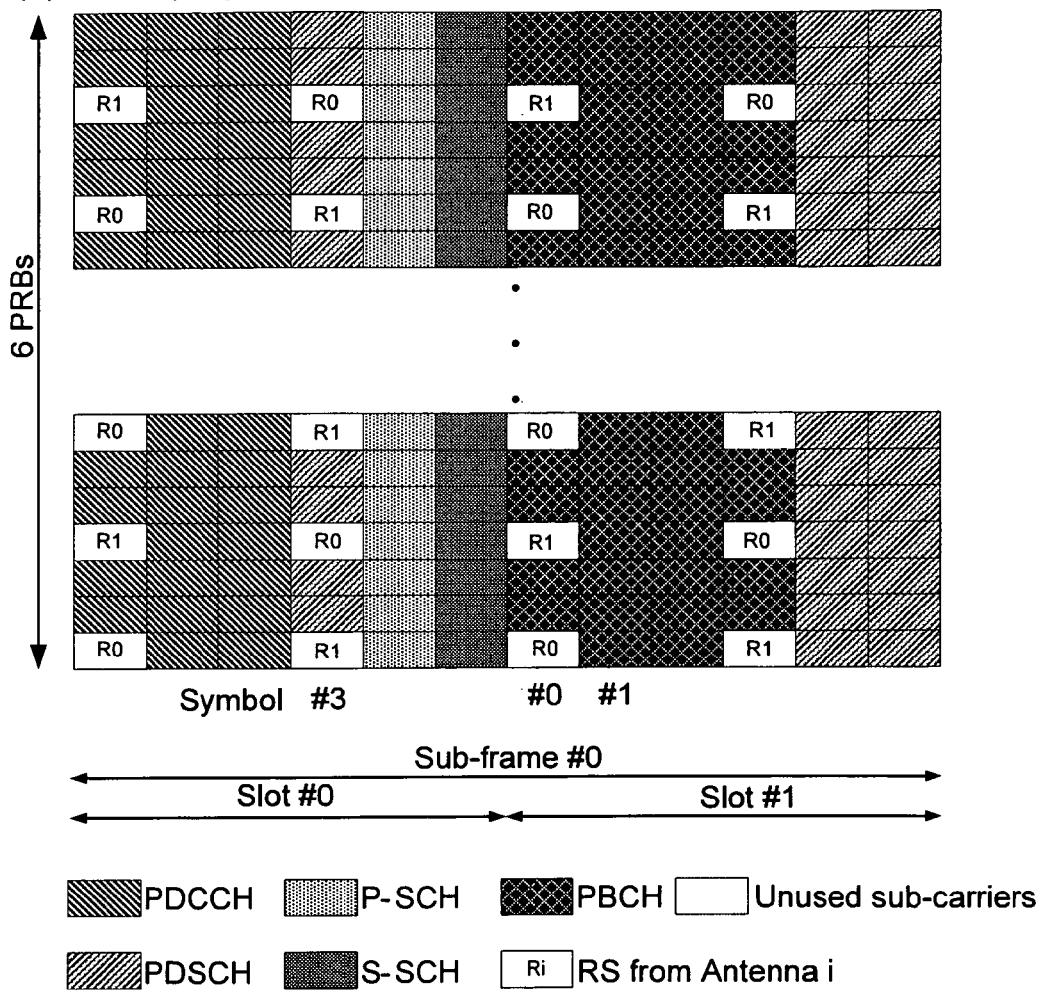
FIG. 4e is diagram of a sub-frame with an extended cyclical prefix for a two antenna base station according to an embodiment of the present invention.
Figure 4F:
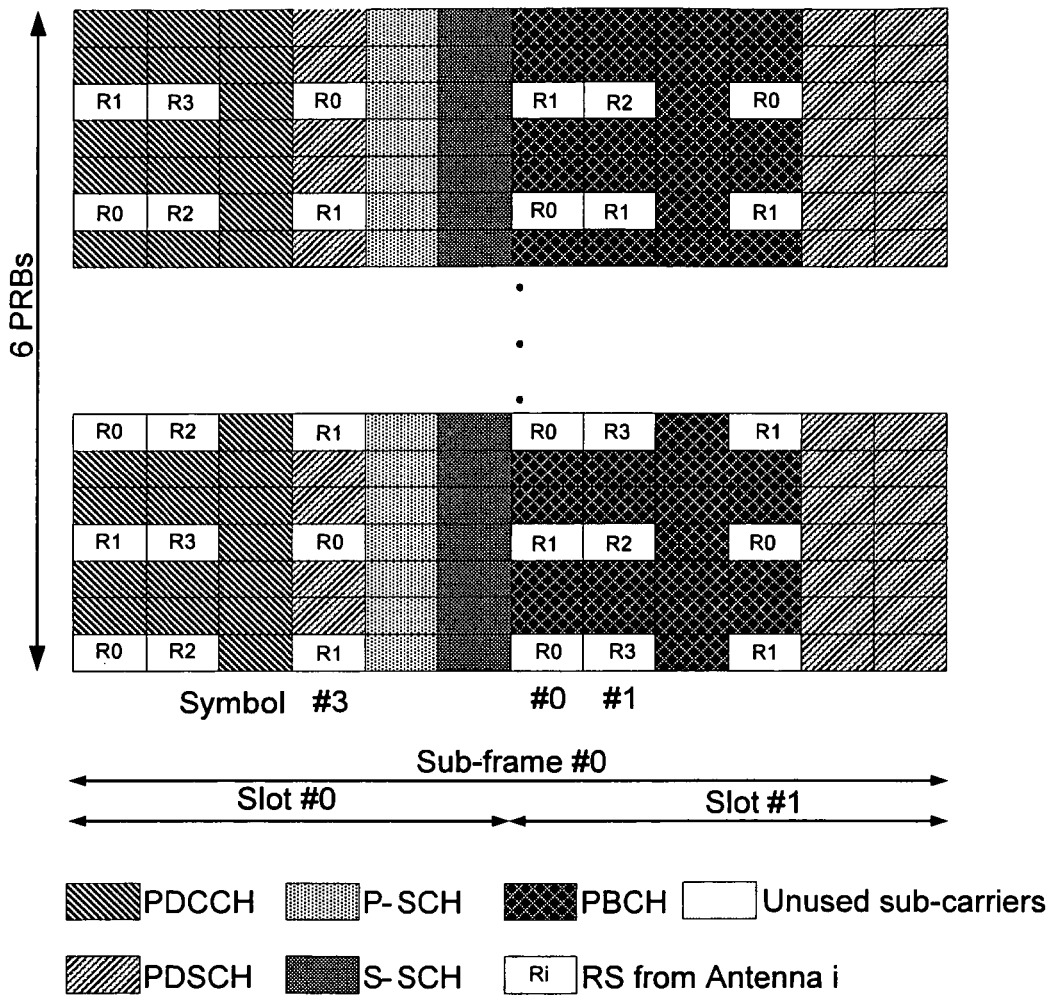
FIG. 4f is diagram of a sub-frame with an extended cyclical prefix for a four antenna base station according to an embodiment of the present invention.

In order to provide various signaling information, a base station 44 may provide the user equipment 10 with sub-frames having a predefined or standardized format. In order to provide antenna configuration information to the user equipment in a manner that improves the reliability with which the user equipment determines the antenna configuration and/or the transmission diversity scheme of the base station, the base station and the user equipment may be configured in accordance with one embodiment of the present invention to transmit and receive, respectively, the PBCH that is mapped to resource elements within a sub-frame in a different manner than those depicted in FIGS. 1a-1f. In this regard, FIGS. 4a-4f depict diagrams of exemplary PBCH mapping for various antenna configurations and transmission diversity schemes according to embodiments of the present invention. The sub-frames of FIGS. 4a-4f include six physical resource blocks (PRBs) i.e. 72 sub-carriers which is 1040 kHz, included in sub-frame #0. Sub-frame #0 is comprised of two slots designated slot #0 and slot #1. Each slot can be comprised of a series of symbols which, in turn, are comprised of a plurality, e.g., seventy-two, resource elements and associated with a respective channel such as a physical downlink (or download) control channel (PDCCH), a physical downlink shared channel (PDSCH), a primary synchronization channel (P-SCH), a secondary synchronization channel (S-SCH), a physical broadcast channel (PBCH), and unused sub-carriers. The sub-frame of FIGS. 4a-4f also include reference signals, namely, R0, R1, R2, and R3 which provide information regarding a first, second, third and fourth antennas of the base station. Further, FIGS. 4a-4c depict exemplary sub-frames with cyclical prefixes having a normal length where the sub-frame can comprise fourteen OFDM symbols. On the other hand, FIGS. 4d-4f depict exemplary sub-frames with extended cyclical prefixes where the sub-frame can comprise twelve OFDM symbols.

The PBCH in the sub-frames of FIGS. 4a-4f can be used to detect antenna configuration information for a base station, which can include the number of antennas utilized by the base station and/or the transmission diversity scheme utilized by the base station. The PBCH in the sub-frames of FIGS. 4a-4f can facilitate detecting antenna configuration and/or transmission diversity schemes by mapping symbols within the PBCH such that sufficiently different reference signal placements, or locations, occur across the mappings for different antenna configurations. In some embodiments, sufficiently different reference signal placements occur across the mappings for different antenna configurations can occur within the first two symbols of the PBCH. As discussed above in conjunction with FIGS. 1a-1f, the conventional mapping of the PBCH to resource elements, or in other words the position of reference signals within the PBCH, can cause an increased error rate associated with the user equipment's determination of the antenna configuration and/or transmission diversity scheme of the base station because the conventional mapping results in identical reference signals being included in the first three PBCH symbols in instances in which the base station has either two or four antennas with reference signals associated with the additional antennas of a four antenna base station, i.e., R2 and R3, only being provided in the fourth PBCH symbol. As such, a PBCH mapping, in accordance with one embodiment of the present invention where the reference signals associated with various antenna configurations differ substantially in both time and frequency or at least more so than the conventional mapping, can result in a decreased error rate associated with the user equipment's determination of the antenna configuration and/or transmission diversity scheme of the base station. In particular, PBCH mappings that are significantly different between, for example, a two antenna configuration and a four antenna configuration, can allow for the user equipment to more reliably and perhaps more quickly determine the antenna configuration and/or transmission diversity scheme of the base station. Various embodiments of the invention can generate a one-to-one relationship between a selected antenna configuration and a successful decoding procedure, preventing the propagation of incorrect antenna configuration selections. By increasing the differentiation between the symbols of the PBCH, the likelihood of incorrect antenna configurations providing successful decoding of the PBCH can be reduced. As such, the sub-frames of FIGS. 4a-4f provide an exemplary PBCH mapping that increases the differentiation between the PBCH mappings to resource elements over the conventional PBCH mappings without changing the reference signal structure due to the reference signals. The resulting increased differentiation can be identified in the initial PBCH symbols that are provided in accordance with various antenna configurations.

In some embodiments, the mapping of the PBCH can be implemented by a base station, such as BS 44, or other network entity or means. In some embodiments, user equipment, such as mobile terminal 10, or other means can utilize the PBCH mapping in obtaining the antenna configuration information, such as the number of antennas and/or transmission diversity scheme of a base station. In some embodiments, the user equipment can utilize the PBCH mapping to make multiple, parallel assumptions regarding the antenna configuration and multiple PBCH decoding trials in order to determine the correct antenna configuration.

Figure 1B:
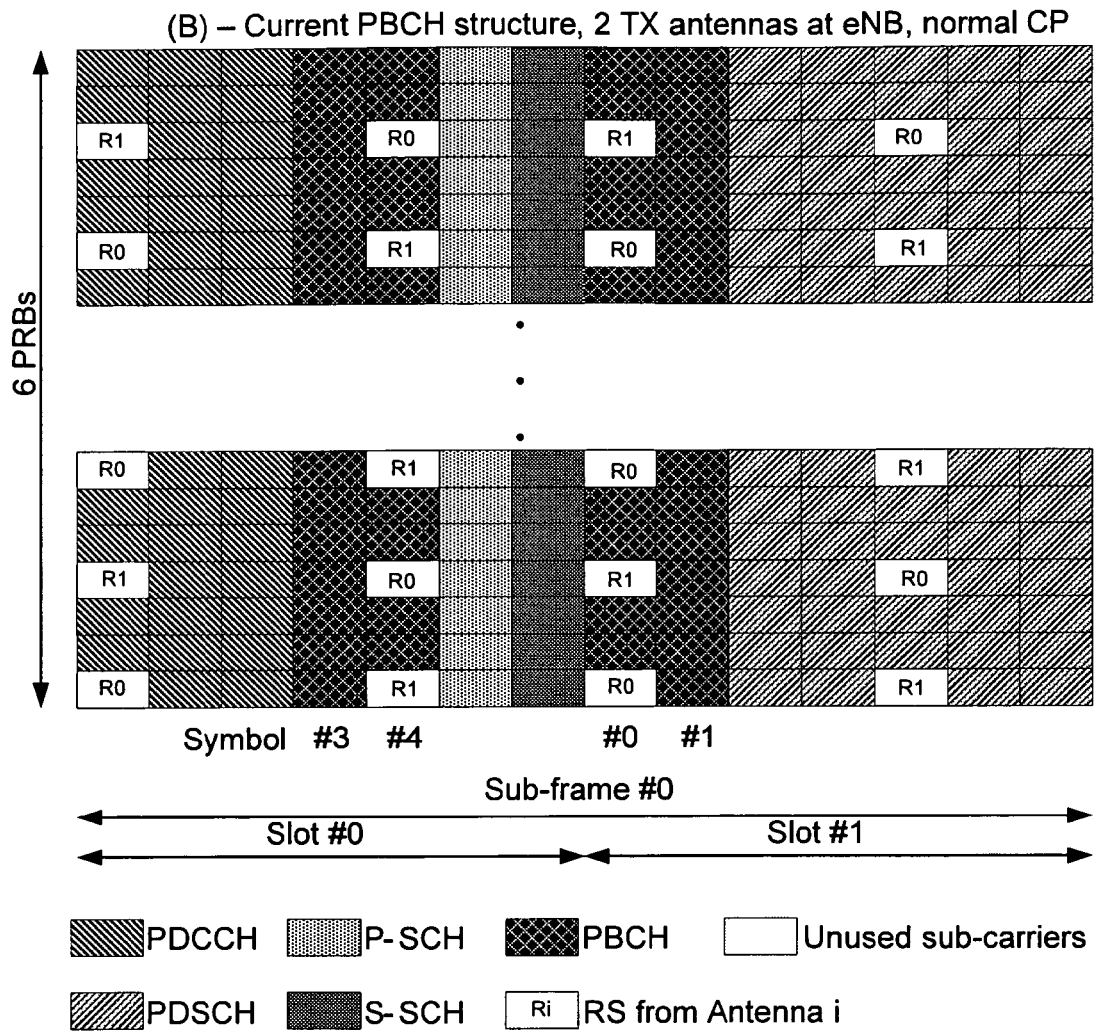
FIG. 1b is diagram of a conventional sub-frame with a normal cyclical prefix for a two antenna base station.
Figure 1C:
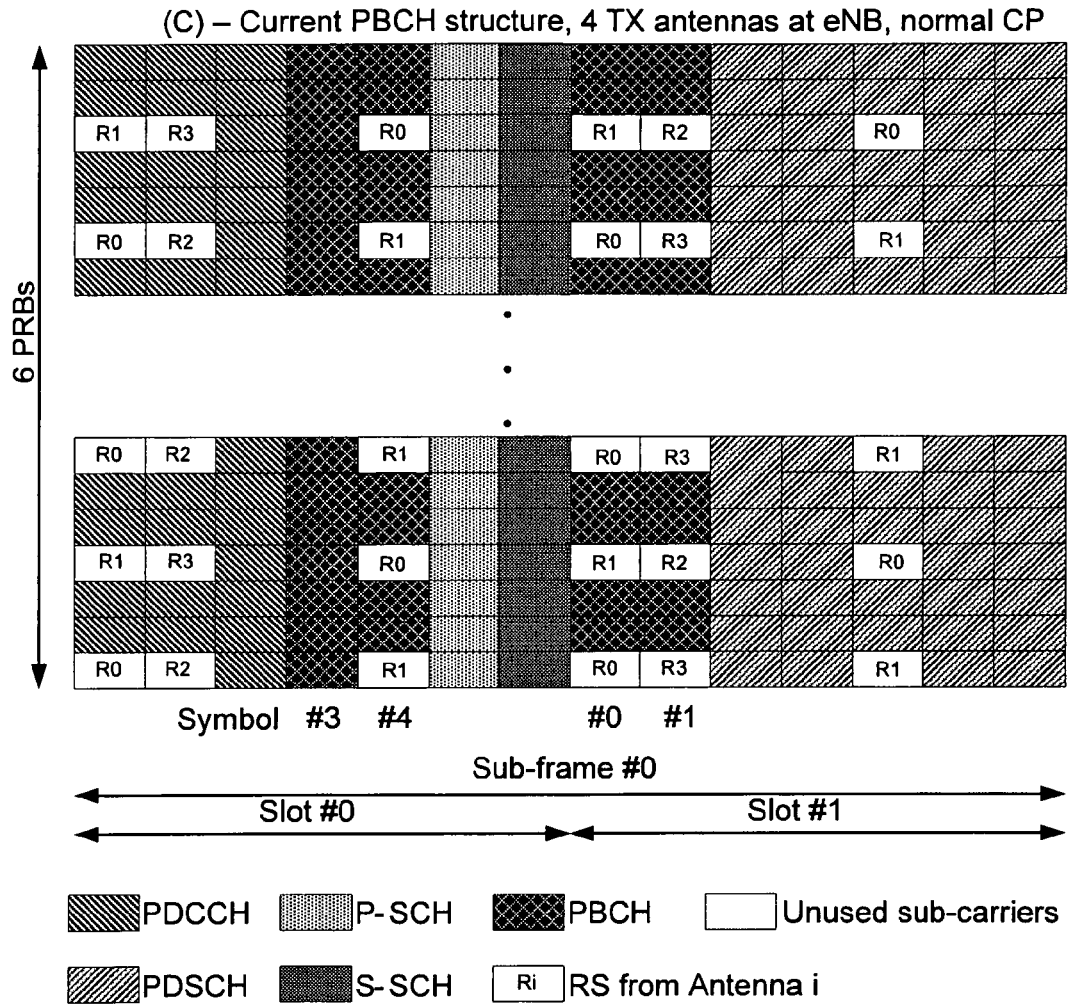
FIG. 1c is diagram of a conventional sub-frame with a normal cyclical prefix for a four antenna base station.

Referring now to FIGS. 4a-4c, the differences in the symbols associated with the PBCH mapping of one embodiment associated with a normal cyclical prefix can be highlighted in comparison to a conventional mapping depicted in FIGS. 1a-1c. In FIGS. 4a-4c, the PBCH can utilize symbol #0 through symbol #3 of slot #1. In contrast to a conventional mapping, all symbols of the PBCH may be mapped into slot #1. In further contrast, all symbols of the PBCH may be mapped to contiguous symbols, such as, for example contiguous OFDM symbols. Note that the first symbol of the PBCH mapping for a normal cyclical prefix, namely symbol #0 of slot # 1, can cause PBCH mapping differences between the single antenna configuration of FIG. 4a and the multiple antenna configurations of FIG. 4b and FIG. 4c. This can be due to the placement, or location, of the reference signals within the symbols of the PBCH. As such, in some embodiments, the placement or location of the reference signals within the symbols of the PBCH can be used create increased diversity between the contents of the symbols of the PBCH. Accordingly, the increased diversity can assist in determining the antenna configuration of a base station. In some embodiments, the reference signals can have sufficiently different placements across different antenna configurations to permit each antenna configuration to be uniquely identified.

In the sub-frame with the normal cyclical prefix of FIG. 4a the first symbol of the PBCH map can contain only R0 reference signals which provide information regarding the first antenna. As a result, in instances where the PBCH mapping includes a first OFDM symbol that comprises only R0 reference signals, it can be determined that a single antenna configuration is being utilized. However, in the sub-frames of FIGS. 4b and 4c for two and four antenna configurations, respectively, the first symbol of the PBCH can not only contain R0 reference signals, but also R1 reference signals which provide information regarding the second antenna. As a result, in instances where the PBCH mapping includes a first OFDM symbol that comprises both R0 and R1 reference signals, it can be determined that a multi-antenna configuration is being utilized.

Further, the differentiation between the two antenna configuration, depicted in FIG. 4b, and the four antenna configuration, depicted in FIG. 4c, can also be identified by considering the second symbol, namely symbol #1 of slot #1, of the PBCH. In the sub-frame associated with the two antenna configuration of FIG. 4b the second symbol of the PBCH can contain no reference signals. As a result, in instances where the PBCH mapping includes a first OFDM symbol that indicates that a multi-antenna configuration, and includes a second OFDM symbol that comprises no reference signals, it can be determined that a two antenna configuration is being utilized. However, in the sub-frame associated with the four antenna configuration of FIG. 4c, the second symbol of the PBCH can contain R2 and R3 reference signals which provide information regarding the third and fourth antennas, respectively. As a result, in instances where the PBCH mapping includes a first OFDM symbol that indicates that a multi-antenna configuration, and includes a second OFDM symbol that comprises R2 and R3 reference signals, it can be determined that a four antenna configuration is being utilized.

Figure 1D:
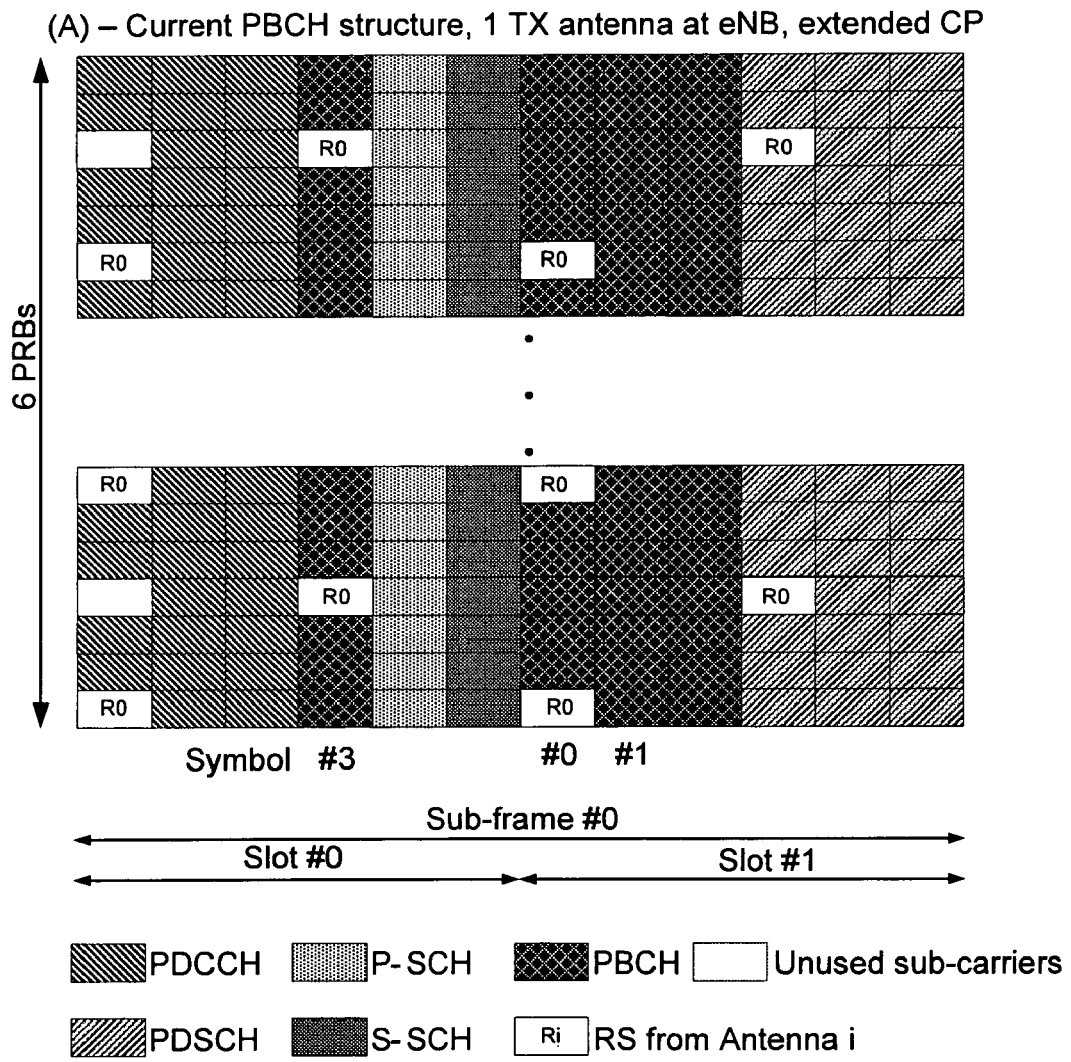
FIG. 1d is diagram of a conventional sub-frame with an extended cyclical prefix for a single antenna base station.
Figure 1E:
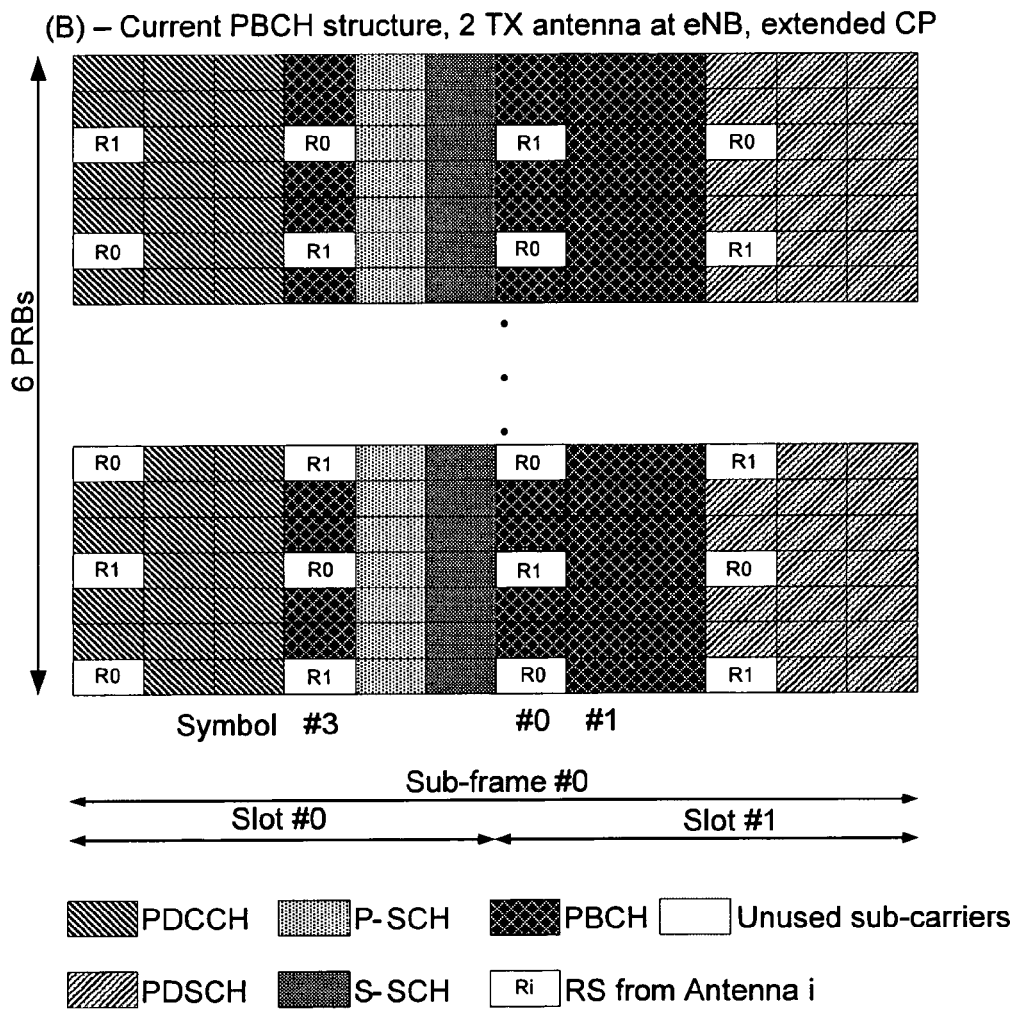
FIG. 1e is diagram of a conventional sub-frame with an extended cyclical prefix for a two antenna base station.
Figure 1F:
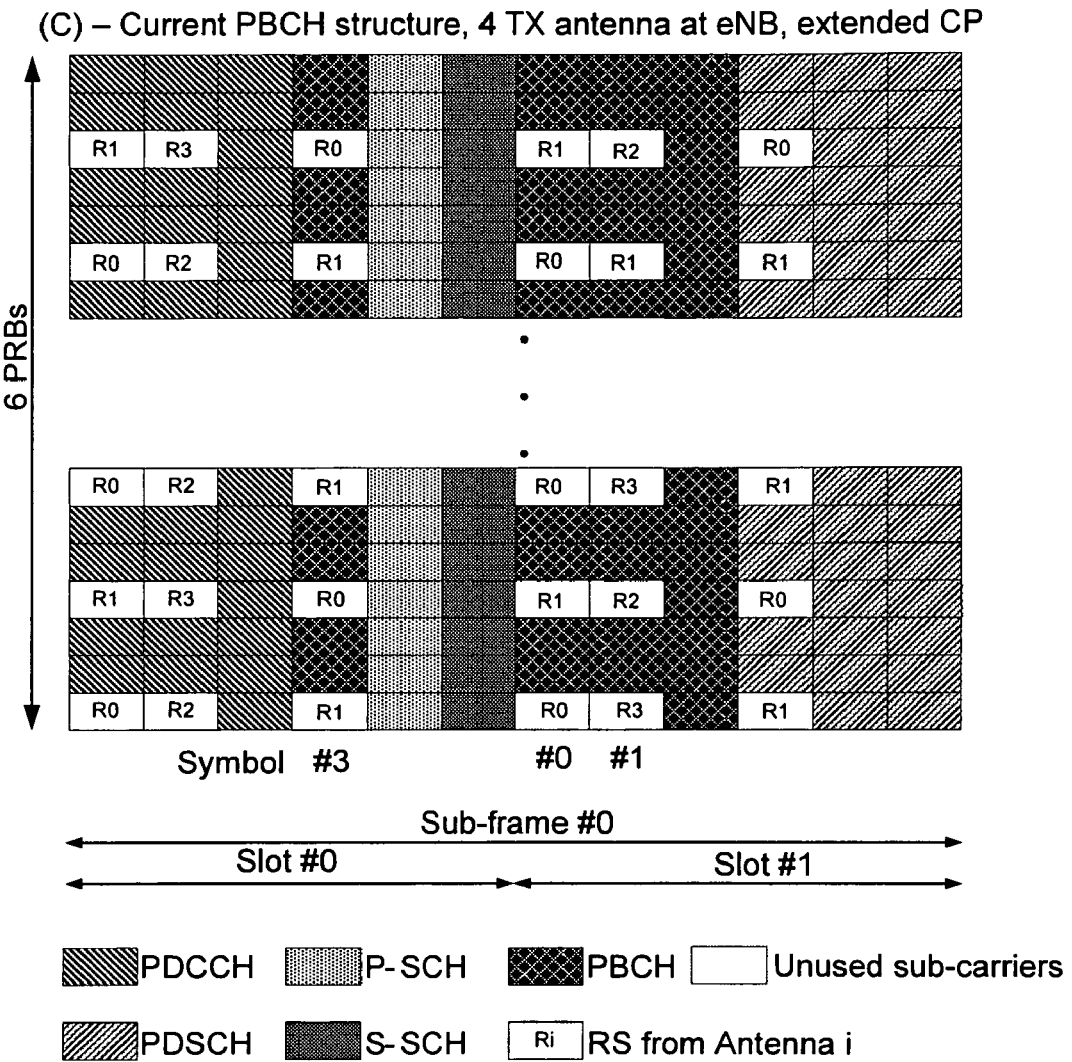
FIG. 1f is diagram of a conventional sub-frame with an extended cyclical prefix for a four antenna base station.

Similarly, referring now to FIGS. 4d-4f, the differences in the symbols associated with the PBCH mapping of another embodiment associated with an extended cyclical prefix can be highlighted in comparison to a conventional mapping depicted in FIGS. 1d-1f. As described above in conjunction with FIGS. 4a-4c, the reference signals in the first symbol of the PBCH permit a single antenna configuration to be distinguished from a multiple antenna configuration, while the reference signals in the second symbol of the PBCH permit a two antenna configuration to be distinguished from a four antenna configuration.

As such, the PBCH mapping of FIGS. 4a-4f supported by network entities, such as base stations, and user equipment in accordance with one embodiment of the present invention provides substantially more differentiation between the different antenna configurations and/or transmission diversity schemes within the first two symbols of the PBCH when compared to the conventional PBCH mapping. In this regard, PBCH mapping associated with the sub-frames of FIGS. 4a-4f provide a different number of reference signals in the PBCH for each different antenna configuration. Additionally, in comparison to the conventional PBCH mapping depicted in FIGS. 1a-1f which provides differences only in the fourth PBCH OFDM symbol to distinguish a two antenna configuration from a four antenna configuration, it is noteworthy that the PBCH mapping according to embodiments of the invention incorporate a sufficient number of reference signals within the first two symbols of the PBCH to permit at least different antenna configurations and/or transmission diversity schemes to be uniquely distinguished.

Additionally, since the PBCH mapping according to one embodiment groups all of the OFDM symbols of the PBCH together, the user equipment can include a micro sleep mode. In the micro sleep mode, the user equipment can deactivate various functionalities, such as components of the receiving chain, e.g., analog to digital converter, mixer, oscillators, amplifiers or the like, such that the user equipment does not expend resources to receive symbols which the user equipment does not require. Further, the resource utilized to detect the PBCH can be switched on and off less frequently since the entire PBCH is grouped together with no interruption. As such switching may not take place instantaneously but take some time, causing some overhead on time. Grouping the entire PBCH together can thus eliminate one switching cycle and can reduce the total power on time of switched components by one overhead time per sub-frame.

FIG. 5 is a flowchart that describes of the operations associated with broadcast channel transmission and reception in accordance with an embodiment of the present invention having a PBCH mapping as described with respect to FIGS. 4a-4f, in accordance with an embodiment of the invention. The procedure of FIG. 5 can comprise mapping symbols to resource elements to generate a PBCH burst at 500, and transmitting the PBCH burst at 510. As also shown in FIG. 5, after transmission, user equipment can receive the PBCH burst at 520 and determine antenna configuration or transmission diversity at 530.

At 500, symbols can be mapped to resource elements. The symbols can be mapped by a base station, such as BS 44 or other means. In some embodiments, the symbols can be mapped to resource elements resulting in the generation of a PBCH burst. In some embodiments, a plurality of symbols can be mapped to a plurality of predefined resource elements, where the plurality of symbols comprises a PBCH. Predefined resource elements can be reserved for resource symbols where the location of the resource elements, for instance with respect to time and frequency, is indicative of an antenna configuration and/or a transmission diversity scheme. In some embodiments, the plurality of symbols can be mapped to a plurality of predefined resource elements in accordance with embodiments of the invention described with respect to FIGS. 4a-4f. Further, in some embodiments, the mapping can be defined such that the first two symbols of the PBCH can permit the identification of at least three different antenna configurations and/or transmission diversity schemes. In this regard, in some embodiments, the three different antenna configurations and/or diversity schemes can be associated with one, two and four antenna configurations in an exemplary E-UTRAN environment. Additionally, in some embodiments, the symbols can be mapped to a PBCH in a sub-frame having first and second slots. In this regard, in some embodiments, the plurality of symbols can be mapped to comprise the PBCH in the second slot of the sub-frame. Further, in some embodiments, the plurality of symbols can be mapped which to comprise the PBCH such that all of the symbols that comprise the PBCH are mapped to a plurality of contiguous resource elements.

At 510, a PBCH burst can be transmitted. The PBCH burst can be in the form of a plurality of symbols which comprise a PBCH. The PBCH burst can be transmitted by a base station, such as BS 44, or other means. In some embodiments, the PBCH burst can be transmitted in the form of four self-decodable bursts. In some embodiments, transmission of the PBCH burst can include mapping the resource elements reserved for the PBCH and sending the PBCH burst over an air interface according to the antenna configuration and the transmission diversity scheme. Further, in some embodiments, channel coding, rate matching, modulation of the PBCH burst, and transmission diversity encoding can also be performed at 510.

At 520, user equipment, such as mobile terminal 10, or other means can receive the PBCH burst. The PBCH burst can be in the form of a plurality of symbols which comprise a PBCH. In some embodiments, the PBCH burst can be received in the form of four self-decodable bursts.

At 530, an antenna configuration and/or transmission diversity scheme can be determined. The antenna configuration and/or transmission diversity scheme can be determined based upon reference symbols within a PBCH. In this regard, the symbols of the PBCH can be serially decoded. In some embodiments, decoding the PBCH can involve selecting a trial antenna configuration and/or transmission diversity scheme in order to decode the PBCH. In some embodiments, the antenna configuration and/or transmission diversity scheme can be determined based on the reference signal content of the received OFDM symbols that make up the PBCH. The result of decoding the PBCH can be compared to the sub-frames described with respect to FIGS. 4a-4f to determine the associated antenna configurations and transmission diversity schemes. In some embodiments, if a successful match is found between the decoded PBCH and the PBCH mappings in the sub-frames of FIGS. 4a-4f then a correct trial antenna configuration was selected by the user equipment. In this regard, a one-to-one relationship can be established between a trial antenna configuration selection and a successful decoding operation. Additionally, in some embodiments, the antenna configuration and/or transmission diversity scheme can be determined based upon the reference signals included within the first two symbols of the PBCH. Further, in some embodiments, the first two symbols of the PBCH can uniquely distinguish at least three different antenna configurations and/or transmission diversity schemes. In this regard, in some embodiments, the three different antenna configurations and/or diversity schemes can be determined that are associated with one, two and four antenna configurations in an exemplary E-UTRAN environment. Additionally, in some embodiments, the symbols of the received PBCH can be included in a sub-frame having first and second slots. In this regard, in some embodiments, the plurality of symbols comprising the received PBCH can be located in the second slot of the sub-frame. Further, in some embodiments, the plurality of symbols comprising the received PBCH can be arranged such that all of the symbols that comprise a PBCH with a plurality of contiguous resource elements.

In some embodiments, mappings can be provided where a sufficient difference in the mappings for different antenna configurations and/or transmission diversity schemes exist. Therefore, in embodiments where different or incorrect antenna configurations or diversity schemes are assumed, these mappings can reduce the risk that the PBCH can be decoded even with an incorrect assumption. As such, it can be beneficial if the reference signals are located rather early in the bit stream, for example, in the first OFDM symbol that carries PBCH. In this regard, most of the bits will not be associated correctly with a wrong hypothesis on antenna configuration and/or transmission diversity.

This is shown in the example below that includes a sequence of transmitted bits. The "R" within the sequence of bits indicates a position occupied by a reference signal transmitted by the associated antenna, and the numbers denote the bits in a numerical order. 1 ANT and 2 ANT denote a 1 or 2 antenna configuration respectively.

| 1 ANT: | 1 | R | 2 | 3 | 4 | 5 | 6 | 7 | 8 | 9 |
|---|---|---|---|---|---|---|---|---|---|---|
| 2 ANT: | 1 | R | R | 2 | 3 | 4 | 5 | 6 | 7 | 8 |

As can be seen, given a blind antenna configuration assumption, only bit 1 is interpreted correctly when the assumption on the antenna configuration is incorrect. Also note that bit 9 is not transmitted in the example two antenna bit sequence.

For comparison purposes only, a worst case mapping can be to locate the reference signals at the very end of the bit stream as indicated below.

| 1 ANT: | 1 | 2 | 3 | 4 | 5 | 6 | 7 | 8 | 9 | R |
|---|---|---|---|---|---|---|---|---|---|---|
| 2 ANT: | 1 | 2 | 3 | 4 | 5 | 6 | 7 | 8 | R | R |

Here, all the bits except bit 9 overlap for both assumptions. As such, the potential for a mismatch is increased, particularly in a situation where FEC decoding is utilized which is designed to counteract sporadic bit errors. Accordingly, the differentiation between the two sequences at bit 9 may be corrected in the FEC decoding process and an incorrect assumption on antenna configuration may erroneously be considered a correct assumption. Therefore, in this worst case example, the correct antenna configuration detection may be practically impossible to ascertain.

As such, various embodiments of the invention achieve differences in mapping by intelligent selection of the location where reference signals are inserted. Since, in some embodiments, reference signals have to be inserted at particular locations within a bit sequence, such as the bit sequences within the sub-frames of FIGS. 4a-4f, the process of inserting reference signal at intelligent locations may not increase complexity. Therefore, it can be advantageous to implement mapping, such as the mapping of the PBCH, in this manner. An additional embodiment can be to place reference signals within an area where the PBCH is transmitted for some antenna configurations, and outside for other configurations.

However, it should be understood, that the invention can also be realized by other means that may incur some additional complexity. One such example can be to map the bits with in the sequence in a different order, e.g. in reverse numerical order from the previously discussed placement of reference signals as depicted below.

| 1 ANT: | 9 | 8 | 7 | 6 | 5 | 4 | 3 | 2 | 1 | R |
|---|---|---|---|---|---|---|---|---|---|---|
| 2 ANT: | 8 | 7 | 6 | 5 | 4 | 3 | 2 | 1 | R | R |

This example mapping can also avoid any overlap, despite the placement of the reference signals at the end of the bit sequence. More generally to mapping in the example reverse order can be to interleave the bits suitably. As such, depending on the placement of the reference signals different interleaving can provide improved results. Simple interleaving options can be to map in reverse order in time and/or frequency domain or both. Additionally, in some embodiments, an interleaving option can be to cyclically shift the bits by a predetermined number of bits.

Another variant embodiment can be to use different interleaving patterns for different antenna configurations, e.g. direct or numerical mapping and reverse or reverse numerical mapping as depicted below.

| 1 ANT: | 1 | 2 | 3 | 4 | 5 | 6 | 7 | 8 | 9 | R |
|---|---|---|---|---|---|---|---|---|---|---|
| 2 ANT: | 8 | 7 | 6 | 5 | 4 | 3 | 2 | 1 | R | R |

Accordingly, in some embodiments, it can be possible to distinguish different antenna configurations, even if they use the same number of reference signals (not shown).

Further, there are also other options for achieving sufficient differences of the bit ordering. For example, in UMTS it is envisaged to use different redundancy versions for different retransmissions of data packets. With respect to generating redundancy versions, a network entity, such as a base station can generate any number of redundancy versions of a set of data packets. Further, the different redundancy versions can be generated by small variations in a rate matching stage. In some embodiments, a virtual buffer approach can be used where the bits after encoding are written in an interleaved fashion into a virtual buffer and then the required number of bits is read out of the virtual buffer. If the end of the buffer is reached, reading continues cyclically from the beginning. As such, different redundancy versions can be obtained by starting the reading process from different predefined starting points. While this is one possibility to generate different redundancy versions, various methods of generating redundancy versions can implemented in accordance with the present invention. This can allow implementation of an optimal HARQ (Hybrid Automated Repeat ReQuest) at the receiver. As a result, in some instances, for example, first, second, and third redundancy versions may be generated with respect to a particular set of data packets. Redundancy versions are typically utilized in situations where a base station requests an acknowledgement from the user equipment after the data packets have been received and decoded. In order for the user equipment to decode a redundancy version, the user equipment must not only utilize the proper antenna configuration and/or transmission diversity scheme, but the user equipment must also utilize an indication, such as a number, of the redundancy version that has been received. In situations where the user equipment is unable to decode the redundancy version, another redundancy version can be transmitted from the base station. This second received redundancy version can be combined with the first redundancy version to decode and decipher the received data.

Figure 7:
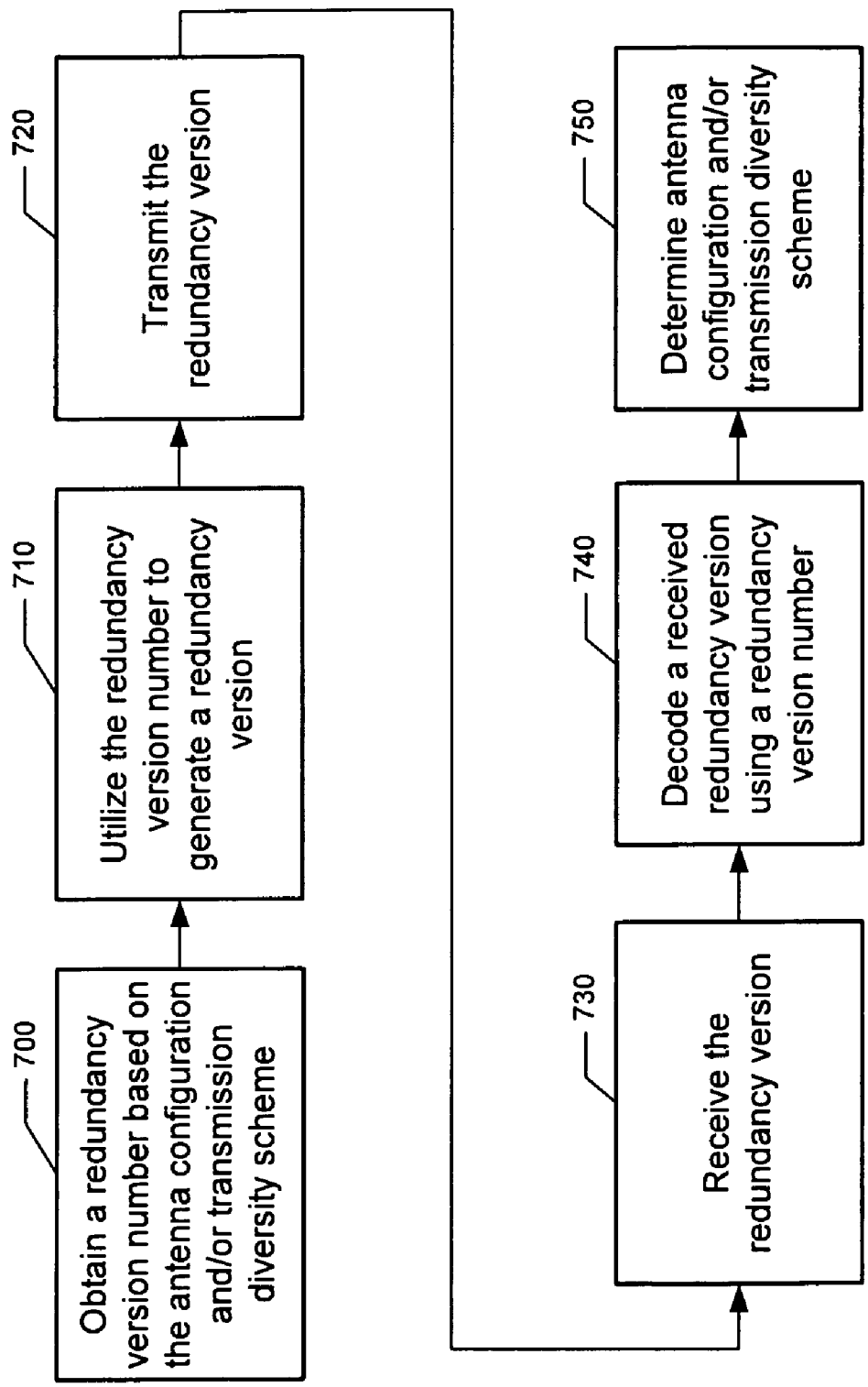
FIG. 7 is a flowchart of the operation associated flowchart of a procedure of utilizing redundancy versions to determine antenna configuration and/or transmission diversity schemes.

FIG. 7 depicts a flowchart of a procedure of utilizing redundancy versions to determine antenna configuration and/or transmission diversity schemes. The method of FIG. 7 comprises the operations of obtaining a redundancy version number based on the antenna configuration and/or transmission diversity scheme at 700, utilizing the redundancy version number to generate a redundancy version at 710, and transmitting the redundancy version at 720. As also shown in FIG. 7, after transmission, user equipment can receive the redundancy version at 730, decode a received redundancy version using a redundancy version number at 740 and determine an antenna configuration and/or transmission diversity scheme at 750.

In some embodiments, redundancy versions can be utilized with the PBCH to provide antenna configuration information. For example, a scheme can be developed where single antenna base stations transmit first redundancy versions as part of initial transmissions of data packets, such as the PBCH. In this regard, base stations with two antennas can transmit second redundancy versions as part of initial transmissions of data packets, such as the PBCH. Additionally, base stations with four antennas can transmit third redundancy versions as part of an initial transmission of some data packets, such as the PBCH. Note that one, two, and four antenna configurations are associated with first, second, and third redundancy versions, respectively, in this example embodiment for illustration purposes. In various embodiments, the associations between the antenna configurations and the number of the redundancy version can be predefined and known to various network entities, including, but not limited to, base stations and user equipment. However, it is contemplated that any combination of antenna configurations and redundancy versions can be implemented.

As such, the user equipment initially selects one combination of antenna configuration and redundancy version, e.g., a one antenna base station and a first redundancy version, and then attempts to decode the data, such as the PBCH, accordingly. If the user equipment uses the proper antenna configuration and/or transmission diversity scheme and consequently uses the proper indication or number of the redundancy version, then decoding of the data packets can be successful and the user equipment will have also discovered the proper antenna configuration. If the user equipment is unsuccessful in decoding the redundancy version, then the user equipment may use a different antenna configuration and associated redundancy version number to decode the data to determine the proper antenna configuration in consideration of previous decoding attempts. In some embodiments, the user equipment may receive an additional redundancy version, after having received the original redundancy version and selected an incorrect antenna configuration to decode the original redundancy version, and may then select a new antenna configuration and associated redundancy version number based in consideration of prior unsuccessful decoding attempts to decode the additional redundancy version. As such, different redundancy versions can be used for different antenna configurations and/or diversity schemes. In some embodiments, redundancy versions can be utilized with respect to the information provided in the PBCH. Similar to using different interleavers, as explained above, using different redundancy versions can also ensure that there is no or little overlap in the bits if the wrong assumption is used. An advantage of this approach can be that rate matching can be used for PBCH as well, and a rate matching implementation can also support generation of different redundancy versions which is needed for data channels. As such, additional complexity can be avoided by utilizing a different configuration of existing components.

Figure 6:
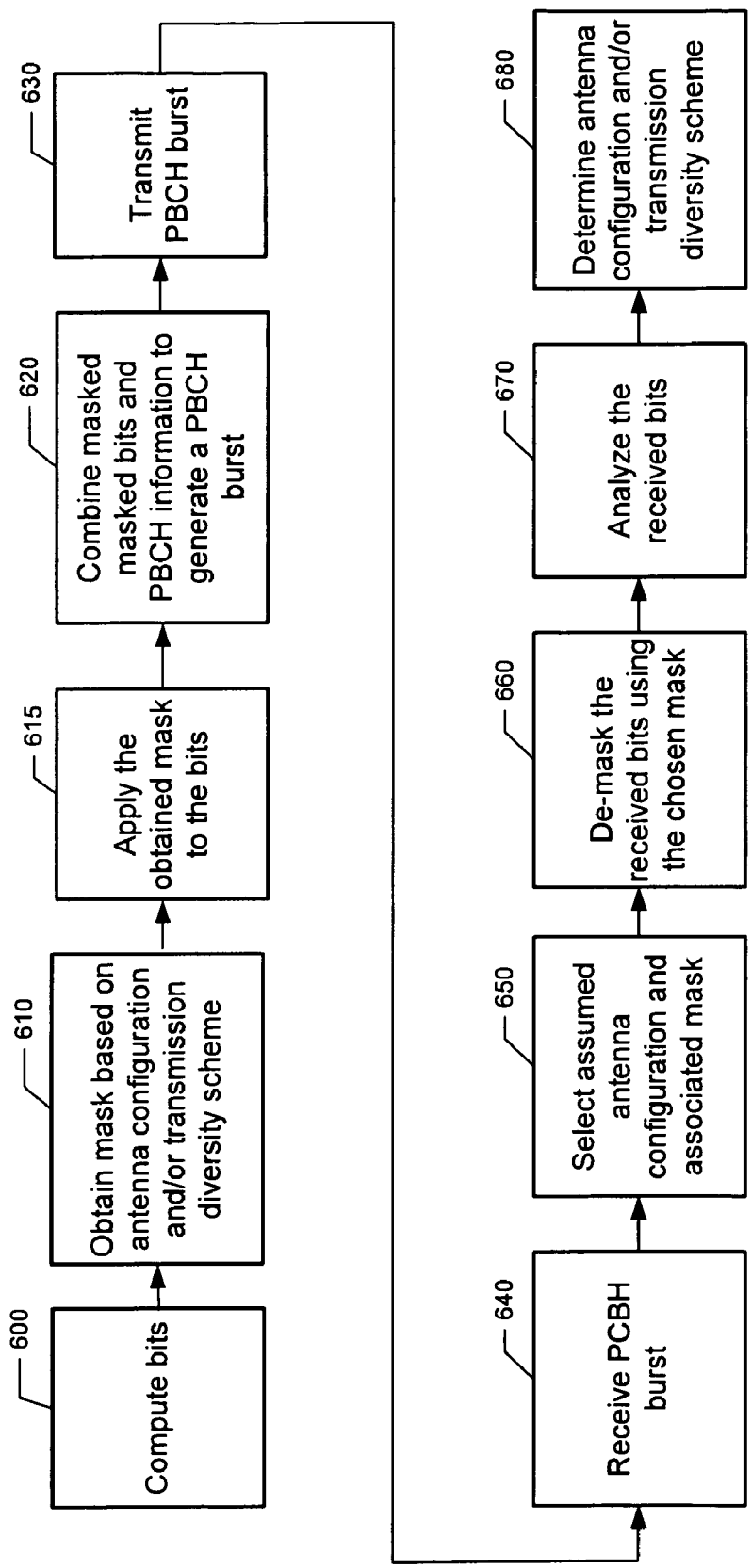
FIG. 6 is a flowchart of the operations associated with broadcast channel transmission and reception in accordance with an embodiment of the present invention.

While the foregoing embodiments provide a mechanism for increasing the reliability with which the user equipment can obtain antenna configuration information, the method and apparatus of another embodiment provide antenna configuration information by utilizing different masks for each different antenna configuration. By identifying the mask that was utilized, the user equipment can, in turn, determine the antenna configuration and/or the transmission diversity scheme. In this regard, FIG. 6 is a flowchart of a PBCH transmission and reception procedure in accordance with another embodiment of the present invention. The procedure of FIG. 6 is directed toward the use of a mask, such as a CRC mask, to provide antenna configuration information and may be utilized to verify that a correct antenna configuration has been identified by the user equipment. The embodiment of the present invention that is described with respect to FIG. 6 can work in combination with the PBCH mapping described with respect FIGS. 4a-4f, as well as a other PBCH mappings, such as that provided by the conventional PBCH to resource element mapping in the sub-frames of FIGS. 1a-1f.

In short, a different mask is predefined for each different antenna configuration and/or transmission diversity scheme, such as a first mask for a one antenna configuration, a second mask for a two antenna configuration utilizing SFBC and a third mask for a four antenna configuration utilizing FSTD. At least some of the bits transmitted by the network entity, such as the base station 44, and received by the user equipment are masked with the mask associated with the particular antenna configuration of the network entity. In one embodiment, bits of the PBCH may be masked. More particularly, the PBCH is typically comprised of information bits and Cyclic Redundancy Check (CRC) bits that are computed based upon the information bits to permit verification of the information bits. In this embodiment, the CRC bits may be masked.

In one embodiment in which the CRC bits are masked, the PBCH transmission and reception procedure of FIG. 6 can comprise the network entity computing bits, such as, for example, CRC bits at 600, obtaining a mask based on a antenna configuration and/or a transmission diversity scheme of a network entity, e.g., base station or eNodeB at 610, applying the obtained mask the bits at 615, combining the masked bits and PBCH information bits to generate a PBCH burst at 620 and transmitting the PBCH burst at 630. As also shown in FIG. 6, after transmission, the user equipment can receive the PCBH burst at 640 and then determine the mask that was utilized prior to verifying the information bits by, in some embodiments, performing a CRC check with the de-masked CRC bits. In one embodiment, the mask is determined by selecting an assumed antenna configuration and/or transmission diversity scheme, and an associated mask at 650 and then de-masking the received bits using the selected mask at 660 prior to analyzing the received bits at 670 and determining the antenna configuration and/or transmission diversity scheme at 680. Based upon the mask that is determined by the user equipment to have been utilized, antenna configuration information associated with the mask may be determined to permit the information bits to be correctly and reliably demodulated and/or to permit a prior assumption regarding the antenna configuration to be verified.

At 600, bits can be computed, such as, for example, CRC bits. The CRC bits can be computed with respect to the information bits of the PBCH, such as, for example, the PBCH of FIG. 4a. A CRC of the PBCH can be computed using any known technique. The CRC bits can be computed by a base station, such as BS 44, a computing device connected to a base station, or any other means.

At 610, a mask can be obtained from a predetermined set of masks. The mask can be obtained from the predetermined set of masks where each mask in the set of mask can be associated with a different antenna configuration and/or a different transmission diversity scheme. The mask can be obtained that is associated with a desired antenna configuration and/or transmission diversity scheme. In some embodiments, a mask can be obtained such that, when applied, at least three different antenna configurations and/or transmission diversity schemes can be uniquely distinguished. Since masks within the predetermined set of masks can be associated with different antenna configurations and transmission diversity schemes, in some embodiments, a mask can be obtained based on the antenna configuration and transmission diversity scheme of the base station. Additionally, the set of masks and the associated antenna configurations and transmission diversity schemes can be known not only by the base station, but by the user equipment with which the base station will communicate. In some embodiments, the mask can be a bit mask with a sequence of equal length to the number of bits to be masked, such as, for example, the number of CRC bits to be masked.

In developing the predetermined set of masks, according to some embodiments, a maximum Hamming distance can be utilized to develop each mask within the predefined set of masks. A Hamming distance can describe the number of substitutions or other operations that can be undertaken to convert a first entity, such as a first mask sequence, into in a second entity, such as a second masking sequence. For example, a first mask could be a bit sequence 000. A second mask having a maximum Hamming distance from the first mask would therefore be the bit sequence 111. In some embodiments, when the selected mask is a bit sequence equal to zero, application of the mask may be unnecessary and, hence, processing may be expedited since applying the mask can have no effect on the bits to be masked. For two masks, selecting one as all zeros and another as all ones, as described above will maximize the Hamming distance between the two. However, if more than two masks are required, it is not possible to have such simple selections, but a more advanced mask generation can be utilized. In some instances, it may also not be possible to achieve the equal Hamming distances between all masks. In some embodiments, the resultant unequal Hamming distances can be exploited when identifying different antenna configurations. As has been explained above, also during demodulation and processing of the reference signals, some information can be obtained regarding the likelihood of the possible antenna configurations. The obtained information may not be sufficient to solely base the antenna configuration selection on this evaluation, but it can be combined with, for example, the CRC check to enhance the performance of both schemes. As such, in some instances, particular antenna configurations may be more easily distinguished based on the reference signals than others. Thus, in some embodiments, Hamming distance maximization may be sacrificed if this likelihood of different error probabilities between antenna configurations is taken into account. For example, if it is determined that the highest error probability is given for confusing a single antenna configuration with a two antenna configuration, the mask may be developed in a manner that maximizes the Hamming distance between the single antenna configuration and the two antenna configuration, even if the result is a less than maximum Hamming distance with respect the mask for a four antenna configuration. Developing the Hamming distances in this manner can ensure that all antenna configurations can be distinguished from one another with high reliability, either by making use of the information obtained during, for example, a demodulation or a CRC check. In some embodiments, it may be determined that one of either demodulation or a CRC check may provide more reliable results than the other. As such, a combination of demodulation and CRC checks can be implemented to provide an acceptable performance for all cases.

Further, the set of masks can be developed based on the possible antenna configurations and transmission diversity schemes in a communications system such as the communications system of FIG. 3. In an exemplary E-UTRAN environment, three masks may be defined for the one, two and four antenna configurations. However, embodiments of the present invention are not limited to E-UTRAN environments, and as such any number of masks can be utilized as possible selections based on various antenna configurations and transmission diversity schemes. Further, in some embodiments, the computation of the CRC may be modified in order to facilitate mask generation, such as by using different CRC polynomials, and considering the Hamming distance. Further, instead of masking the output of the CRC generator, and thus obtaining different output depending on the antenna configuration, three different CRC generators are employed. Note that if we consider the masking to be part of the CRC generator, then the three different masks can be considered to define three different CRC generators. However, different CRC generators can also be designed by applying different elements to the CRC generation process. Examples might include using different generator polynomials for the CRC generators, or using an interleaver before calculating the CRC from the input data, or using any combination thereof, including a combination which also applies masks on top of the above mentioned differences. As such, the usage of three different CRC generators can be a superset, or, in other words, a more general concept of using different masks.

At 615, the bits can be masked by applying the obtained mask to the bits. Application of the mask at 610 to, for example, the CRC bits can be performed using any known technique, such as via an exclusive-or logical operation. Since, in some embodiments, the mask is selected based upon the antenna configuration and/or the transmission diversity scheme, the application of the mask can impart information into the result regarding at least one of the antenna configuration and/or the transmission diversity scheme. While this exemplary embodiment of the invention is directed toward application of the obtained mask to CRC bits, it is contemplated that embodiments of the invention may be applied to any sequence of bits. In some embodiments, the obtained mask can be applied to bits within the PBCH. In some embodiments, the masking can be performed after FEC, which can result in masking the encoded data in an antenna configuration in a specific way, sometimes called scrambling.

At 620, the masked bits can be combined with PBCH information to generate a PBCH burst. In some embodiments, the masked CRC bits can be appended to PBCH information bits after being masked. In other embodiments, the application of the CRC mask, at 610, can occur after the CRC bits have been appended to the PBCH information bits. Additionally, in some embodiments, more than one mask can be applied in a parallel CRC calculation. Further, in some embodiments, at 620, a forward error correction (FEC) encoding operation can be undertaken that operates on the PBCH information bits and the masked CRC bits. The PBCH information bits and the masked CRC bits can be encoded at a low code rate such as, for example, one-ninth.

At 630, the PBCH burst can be transmitted. The PBCH burst can be transmitted by a base station, such as BS 44, or other means. In some embodiments, the PBCH burst can be transmitted in the form of four self-decodable bursts. In some embodiments, transmission of the PBCH burst can include mapping the resource elements reserved for the PBCH and sending the PBCH burst over an air interface according to the antenna configuration and the transmission diversity scheme that are associated with the selected mask. Further, in some embodiments, channel coding, rate matching, modulation of the PBCH burst, and transmission diversity encoding can also be performed at 630.

At 640, user equipment, such as mobile terminal 10, or other means can receive the PBCH burst. In some embodiments, the PBCH burst can be received in the form of four self-decodable bursts. In some embodiments, the operations subsequent to receiving the PBCH burst at 640 can be implemented in a mirror fashion, for example, in a mobile terminal, to those implemented by, for example, a base station, with respect to operations 600, 610, 615 and 620.

At 650, an antenna configuration and/or transmission diversity scheme can be assumed and an associated mask (that is, associated with the assumed antenna configuration and transmission diversity scheme) can be selected from the predetermined set of masks. Demodulation of the PBCH burst can be accomplished by utilizing the assumed antenna configuration information at 650. In some embodiments, the assumption can be to use the most robust antenna configuration, that is, the configuration with the most antennas, to perform the demodulation. Further, in some embodiments, based on resource element mapping within the PBCH burst as described above in conjunction with FIGS. 4a-4f, an assumed antenna configuration may be determined. In embodiments where FEC encoding occurred, the user equipment can perform FEC decoding after perform a demodulation. Further, in some embodiments, channel decoding, rate matching, can also be performed by the user equipment at 650.

At 660, the user equipment can de-mask the received bits. The de-masking operation can utilize the mask that is associated with the assumed antenna configuration of the base station. In some embodiments, the de-masking operation can be applied to the masked bits, such as the masked CRC bits, by using any known technique, such as via an exclusive-or logical operation.

At 670, an analysis of the received bits can be performed to determine which mask was utilized to mask the bits prior to transmission. In some embodiments, the analysis of the received bits can comprise performing a CRC check of the bits. In some embodiments, a CRC can be computed from the received PBCH information bits. The CRC bits computed from the received PBCH information bits can then be compared to the de-masked CRC bits as part of the analysis. In some embodiments, the comparison can be performed by taking the exclusive-or of the de-masked CRC bits and the CRC bits computed by the user equipment from the received PBCH information bits. In other embodiments, the analysis can include performing a comparison between the CRC bits that have been computed by the user equipment and the received CRC bits that are still masked, such as by performing an exclusive-or operation. In this regard, if the result of an exclusive-or operation is, i.e., matches, the mask associated with the assumed antenna configuration and transmission diversity scheme, then the assumption regarding the antenna configuration information is correct and it is determined which one of the plurality of predefined bit masks was applied to the bits.

At 680, the antenna configuration and/or transmission diversity scheme can be determined. If a match results from the analysis at 670, then the mask used to mask the bits is known and it can be determined that the proper antenna configuration information was assumed by the user equipment. As such, when, in some embodiments, the CRC check results in a match, the antenna configuration and/or transmission diversity scheme selected by the user equipment can be considered highly reliable.

If the result of the analysis at 670 finds no match, then, in some embodiments, then, to determine the antenna configuration and/or the transmission diversity scheme, the procedure can revert back to operation 650 and a demodulation of the PBCH burst can occur using a different mask and as such, a different assumed antenna configuration information. In other embodiments, if the result of the analysis at 670 finds no match, then the procedure can revert back to operation 660, and a different mask can be used to de-mask the CRC bits. In this regard, no additional demodulation of the received PBCH burst is performed. Further, in some embodiments where the masking of CRC bits is utilized, calculating the CRC with different masks can be implemented very efficiently. First, the CRC can be calculated without any mask, that is, equivalently with a mask containing all zeros. If the CRC turns out to be all zeros, then the all zero mask has been used and the corresponding antenna configuration can be determined. Otherwise, the CRC can be compared with the other possible masks. If a match results from these comparisons, then the corresponding antenna configurations can be determined. Note that in this embodiment it may not be necessary to re-calculate the CRC for different masks. In particular, it may not be necessary to run all the data bits through the CRC generator polynomial, which can be a complex part of the CRC generation. As such, only a simple comparison of the CRC result with the set of predefined masks may necessary, which can be a very simple operation.

Further, in some embodiments, where no match is found, a decision to revert back to the demodulation operation 650 or to simply de-mask the CRC bits with a different mask at 660 can be based on the signal-to-noise ratio. In situations where the signal-to-noise ratio is high, merely reverting back to de-masking the bits may be more efficient, however, when the signal-to-noise ration is low, reverting back to demodulation of the PBCH burst using a new assumption may be more effective. According to various embodiments, other factors, such as processing complexity, may be considered when determining whether to revert back to demodulation using a new assumption or to revert back to de-masking using a new assumption. In a further embodiment, the CRC bits can be first de-masked with a different mask at 660, and if this is not successful then it is decided to revert back to the demodulation operation at 550. Regardless of the reversion to operation 650 or 660, this procedure can be repeated until a match is found which defines the antenna configuration and the transmission diversity scheme.

According to one aspect of the present invention, the network entity, such as base station 44, and the user equipment, such as mobile terminal 10, which implement embodiments of the present invention generally operate under control of a computer program product. The computer program product for performing the methods of embodiments of the present invention includes a computer-readable storage medium and computer-readable program code portions, such as a series of computer instructions, embodied in the computer-readable storage medium.

In this regard, FIGS. 5 and 6 are flowcharts of methods, apparatuses and program products according to exemplary embodiments of the present invention. It will be understood that each block or step of the flowcharts, and combinations of blocks in the flowcharts, can be implemented by computer program instructions. These computer program instructions may be loaded onto a computer or other programmable apparatus, such as controller 20, to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowcharts support combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems which perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the That which is claimed:

1. A method comprising:
obtaining a bit mask based upon at least one of a number of antennas or a transmission diversity scheme; and
scrambling a plurality of cyclic redundancy check bits to be transmitted with the bit mask to thereby impart information regarding at least one of the number of antennas or the transmission diversity scheme.

2. A method according to claim 1, wherein the scrambling of the plurality of cyclic redundancy check bits comprises scrambling a plurality of cyclic redundancy check bits of a physical broadcast channel with the bit mask.

3. A method according to claim 1 wherein obtaining a bit mask comprises obtaining a bit mask sufficient to permit at least three different numbers of antennas or transmission diversity schemes to be uniquely distinguished.

4. An apparatus comprising at least one processor and at least one memory including computer program instructions, the at least one memory and the computer program instructions configured to, with the at least one processor, direct the apparatus at least to:
obtain a bit mask based upon at least one of a number of antennas or a transmission diversity scheme; and
scramble a plurality of cyclic redundancy check bits to be transmitted with the bit mask to thereby impart information regarding at least one of the number of antennas or the transmission diversity scheme.

5. An apparatus according to claim 4 wherein apparatus is further directed to scramble a plurality of cyclic redundancy check bits of a physical broadcast channel with the bit mask.

6. An apparatus according to claim 4 wherein the apparatus is further directed to obtain a bit mask sufficient to permit at least three different numbers of antennas or transmission diversity schemes to be uniquely distinguished.

7. A method comprising:
analyzing a plurality of bits that were received to determine which one of a plurality of predefined bit masks has been used to scramble cyclic redundancy check bits; and
determining at least one of a number of antennas or a transmission diversity scheme based upon the respective bit mask that is determined to have been used to scramble the cyclic redundancy check bits.

8. A method according to claim 7 wherein analyzing the plurality of bits comprises analyzing a plurality of bits of a physical broadcast channel.

9. A method according to claim 7 wherein determining at least one of an antenna configuration or a transmission diversity scheme comprises uniquely distinguishing between at least three different numbers of antennas or transmission diversity schemes based upon the respective bit mask that is determined to have been used to scramble the cyclic redundancy check bits.

10. A method according to claim 7 wherein analyzing a plurality of bits further comprises using a different predetermined bit mask to scramble the cyclic redundancy check bits if an earlier analysis resulted in a determination that an incorrect bit mask was selected.

11. An apparatus comprising at least one processor and at least one memory including computer program instructions, the at least one memory and the computer program instructions configured to, with the at least one processor, direct the apparatus at least to:
analyze a plurality of bits that were received to determine which one of a plurality of predefined bit masks has been used to scramble cyclic redundancy check bits, said processor also configured to determine at least one of a number of antennas or a transmission diversity scheme based upon the respective bit mask that is determined to have been used to scramble the cyclic redundancy check bits.

12. An apparatus according to claim 11 wherein the apparatus is further directed to analyze a plurality of bits of a physical broadcast channel.

13. An apparatus according to claim 11 wherein the processor is further configured to uniquely distinguish between at least three different numbers of antennas or transmission diversity schemes based upon the respective bit mask that is determined to have been used to scramble the cyclic redundancy check bits.

14. An apparatus according to claim 11 wherein the apparatus is further directed to analyze a plurality of bits by using a different predetermined bit mask to scramble the cyclic redundancy check bits if an earlier analysis resulted in a determination that an incorrect bit mask was selected.

15. A method comprising:
selecting a cyclic redundancy check generator based upon at least one of a number of antennas or a transmission diversity scheme; and
generating, using the selected cyclic redundancy check generator, a plurality of cyclic redundancy check bits to be transmitted to thereby impart information regarding at least one of the number of antennas or the transmission diversity scheme.

16. An apparatus comprising at least one processor and at least one memory including computer program instructions, the at least one memory and the computer program instructions configured to, with the at least one processor, direct the apparatus at least to:
select a cyclic redundancy check generator based upon at least one of a number of antennas or a transmission diversity scheme; and
generate, using the cyclic redundancy check generator selected, a plurality of cyclic redundancy check bits to be transmitted to thereby impart information regarding at least one of the number of antennas or the transmission diversity scheme.

17. A method comprising:
analyzing a plurality of bits that were received to determine which one of a plurality of predefined cyclic redundancy check generators has been applied to the bits; and
determining at least one of a number of antennas or a transmission diversity scheme based upon the respective cyclic redundancy check generator that is determined to have been applied to the bits.

18. An apparatus comprising at least one processor and at least one memory including computer program instructions, the at least one memory and the computer program instructions configured to, with the at least one processor, direct the apparatus at least to:
analyze a plurality of bits that were received to determine which one of a plurality of predefined cyclic redundancy check generators has been applied to the bits; and
determine at least one of a number of antennas or a transmission diversity scheme based upon the respective cyclic redundancy check generator that is determined to have been applied to the bits.

* * * * *